(12) United States Patent
Numakura

(10) Patent No.: US 11,707,674 B2
(45) Date of Patent: Jul. 25, 2023

(54) GAME APPARATUS, CONTROL METHOD, AND CONTROL PROGRAM FOR USING A FIRST GAME TO DEFINE A PLAY AREA OF A SECOND GAME

(71) Applicant: GREE, Inc., Tokyo (JP)

(72) Inventor: Tomoya Numakura, Minato-ku (JP)

(73) Assignee: GREE, Inc., Tokyo (JP)

( * ) Notice: Subject to any disclaimer, the term of this patent is extended or adjusted under 35 U.S.C. 154(b) by 23 days.

(21) Appl. No.: 17/060,464

(22) Filed: Oct. 1, 2020

(65) Prior Publication Data

US 2021/0129020 A1     May 6, 2021

(30) Foreign Application Priority Data

Oct. 31, 2019    (JP) .................................. 2019-199256

(51) Int. Cl.
| | | |
|---|---|---|
| *A63F 13/42* | (2014.01) | |
| *A63F 13/537* | (2014.01) | |
| *A63F 13/45* | (2014.01) | |
| *A63F 13/2145* | (2014.01) | |

(52) U.S. Cl.
CPC .......... *A63F 13/42* (2014.09); *A63F 13/2145* (2014.09); *A63F 13/45* (2014.09); *A63F 13/537* (2014.09)

(58) Field of Classification Search
CPC ........ A63F 13/822; A63F 13/92; A63F 13/42; A63F 13/537; A63F 13/45; A63F 13/2145
See application file for complete search history.

(56) References Cited

U.S. PATENT DOCUMENTS

| | | | | |
|---|---|---|---|---|
| 8,328,611 | B2* | 12/2012 | Sano ..................... | A63F 13/426 |
| | | | | 463/31 |
| 9,242,172 | B2* | 1/2016 | Yamamoto ............. | A63F 13/42 |
| 10,195,521 | B2* | 2/2019 | Shiota .................... | A63F 13/30 |
| 10,328,348 | B2* | 6/2019 | Hisaoka .................. | A63F 13/77 |
| 10,786,730 | B2* | 9/2020 | Morishita ............... | A63F 13/80 |

(Continued)

FOREIGN PATENT DOCUMENTS

| | | |
|---|---|---|
| JP | 2010-259455 A | 11/2010 |
| JP | 2014117389 A | 6/2014 |
| JP | 2015181502 A | 10/2015 |

OTHER PUBLICATIONS

Japanese Office Action dated Jan. 14, 2020 in Japanese Application No. 2019-199256; 10 pages.

(Continued)

*Primary Examiner* — Chase E Leichliter
(74) *Attorney, Agent, or Firm* — Maier & Maier, PLLC

(57) ABSTRACT

A game apparatus for providing a user interface able to realize various game developments without degrading usability, including a display unit including a display screen and a processing unit that causes a plurality of objects to be displayed on the display screen of the display unit, changes, in a case in which at least one object of the plurality of objects is operated by a player in a first game, a display form of at least the operated object and specifies an area corresponding to the object whose display form is changed, and displays, in a case in which a first condition related to the first game is satisfied, the specified area as a second game area used in a second game different from the first game.

13 Claims, 17 Drawing Sheets

(56) References Cited

U.S. PATENT DOCUMENTS

| | | | | |
|---|---|---|---|---|
| 2006/0073862 | A1* | 4/2006 | Shinoda | A63F 13/26 463/2 |
| 2006/0073863 | A1* | 4/2006 | Hagiwara | A63F 13/80 463/9 |
| 2007/0266181 | A1* | 11/2007 | Watanabe | A63F 13/42 710/1 |
| 2010/0197389 | A1* | 8/2010 | Ueda | A63F 13/49 463/43 |
| 2011/0059792 | A1* | 3/2011 | Fujisawa | A63F 13/426 463/43 |
| 2011/0212775 | A1* | 9/2011 | Sano | A63F 13/426 463/31 |
| 2011/0218041 | A1* | 9/2011 | Itami | A63F 13/42 463/31 |
| 2011/0244937 | A1* | 10/2011 | Yamashita | A63F 13/42 463/43 |
| 2011/0306414 | A1* | 12/2011 | McNeely | A63F 13/63 463/31 |
| 2013/0331162 | A1* | 12/2013 | Krivicich | A63F 13/533 463/9 |
| 2014/0080558 | A1* | 3/2014 | Knutsson | A63F 13/2145 463/10 |
| 2014/0135119 | A1* | 5/2014 | Yamada | A63F 13/00 463/31 |
| 2014/0171167 | A1* | 6/2014 | Hawthorne | A63F 3/00075 463/10 |
| 2014/0302935 | A1* | 10/2014 | Royce | A63F 13/822 463/42 |
| 2014/0370950 | A1* | 12/2014 | Hansson | A63F 13/00 463/9 |
| 2014/0370985 | A1* | 12/2014 | Machida | A63F 13/56 463/31 |
| 2015/0224403 | A1* | 8/2015 | Hisaoka | A63F 13/537 463/29 |
| 2015/0238861 | A1* | 8/2015 | Inamori | A63F 13/5375 463/31 |
| 2016/0038831 | A1* | 2/2016 | Katou | A63F 13/2145 463/31 |
| 2016/0059119 | A1* | 3/2016 | Kamobayashi | A63F 13/2145 463/9 |
| 2016/0139773 | A1* | 5/2016 | Kodisoja | A63F 13/80 715/765 |
| 2016/0193533 | A1* | 7/2016 | Hirakawa | A63F 13/56 463/43 |
| 2016/0214014 | A1* | 7/2016 | Shiota | A63F 13/80 |
| 2016/0220897 | A1* | 8/2016 | Hansson | A63F 13/25 |
| 2016/0256777 | A1* | 9/2016 | Umebayashi | A63F 13/822 |
| 2016/0279518 | A1* | 9/2016 | Shimono | A63F 13/80 |
| 2017/0007930 | A1* | 1/2017 | Walls | A63F 13/822 |
| 2017/0072311 | A1* | 3/2017 | Maejima | A63F 13/42 |
| 2017/0072317 | A1* | 3/2017 | Nishikawa | A63F 13/822 |
| 2018/0088781 | A1* | 3/2018 | Kodisoja | A63F 13/2145 |
| 2018/0114398 | A1* | 4/2018 | Cho | A63F 13/533 |
| 2018/0154263 | A1* | 6/2018 | Meurling | A63F 13/335 |
| 2018/0264354 | A1* | 9/2018 | Wada | A63F 13/35 |
| 2018/0361255 | A1* | 12/2018 | Murakami | A63F 13/2145 |
| 2019/0099664 | A1* | 4/2019 | Morishita | A63F 13/822 |
| 2019/0265867 | A1* | 8/2019 | Kodisoja | A63F 13/52 |
| 2019/0299093 | A1* | 10/2019 | Kamfjord | A63F 13/573 |
| 2020/0276502 | A1* | 9/2020 | Gustafsson | A63F 13/80 |
| 2020/0316468 | A1* | 10/2020 | Doi | A63F 13/537 |
| 2020/0391113 | A1* | 12/2020 | Yoshihara | A63F 13/428 |
| 2021/0129020 | A1* | 5/2021 | Numakura | A63F 13/537 |

OTHER PUBLICATIONS

Panel quiz attack 25, Wikipedia[online], 2019, [search on Dec. 26, 2019], Internet <URL:https://ja.wikipedia.org/w/index.php?title = Panel quiz_Attack 25&oldid=74677973>, 79 pgs.

Office Action dated Jun. 28, 2022, in connection with corresponding Japanese Application No. 2020-116077 (5 pp., including machine-generated English translation).

Office Action dated Dec. 13, 2022, in corresponding Japanese Application No. 2020-116077, 4 pages.

* cited by examiner

FIG.4
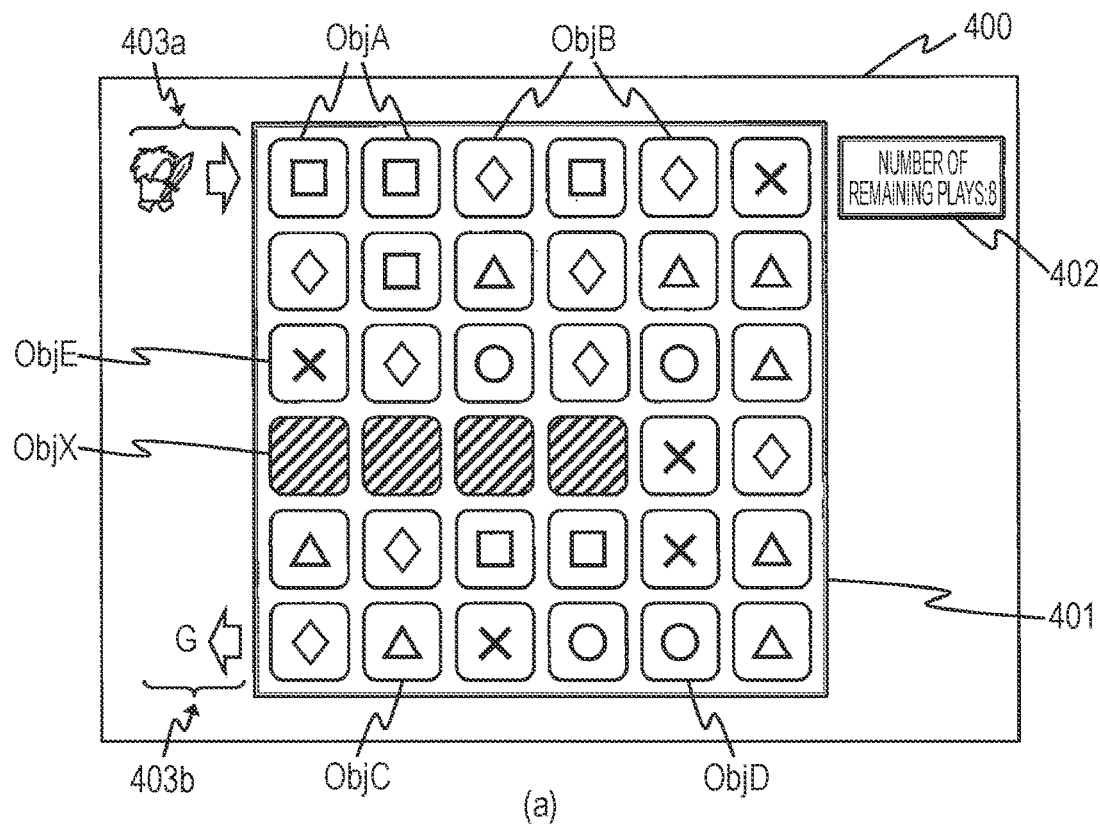
(a)
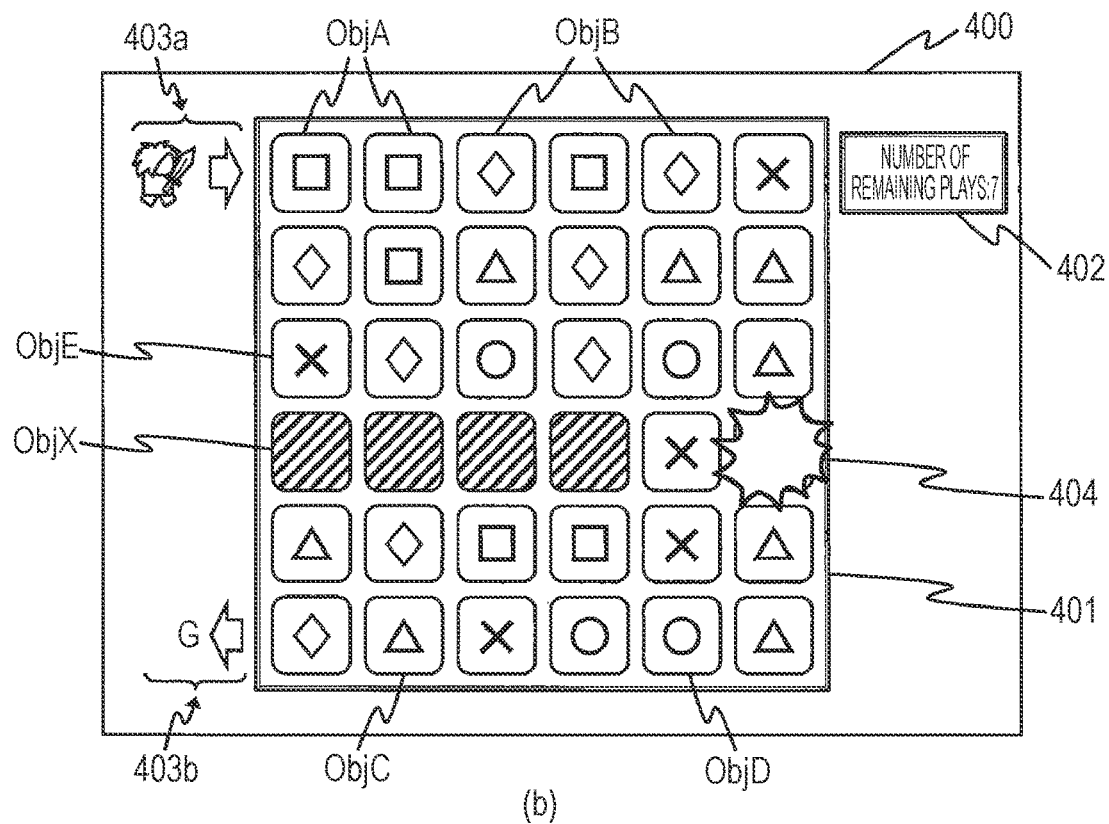
(b)

FIG.5
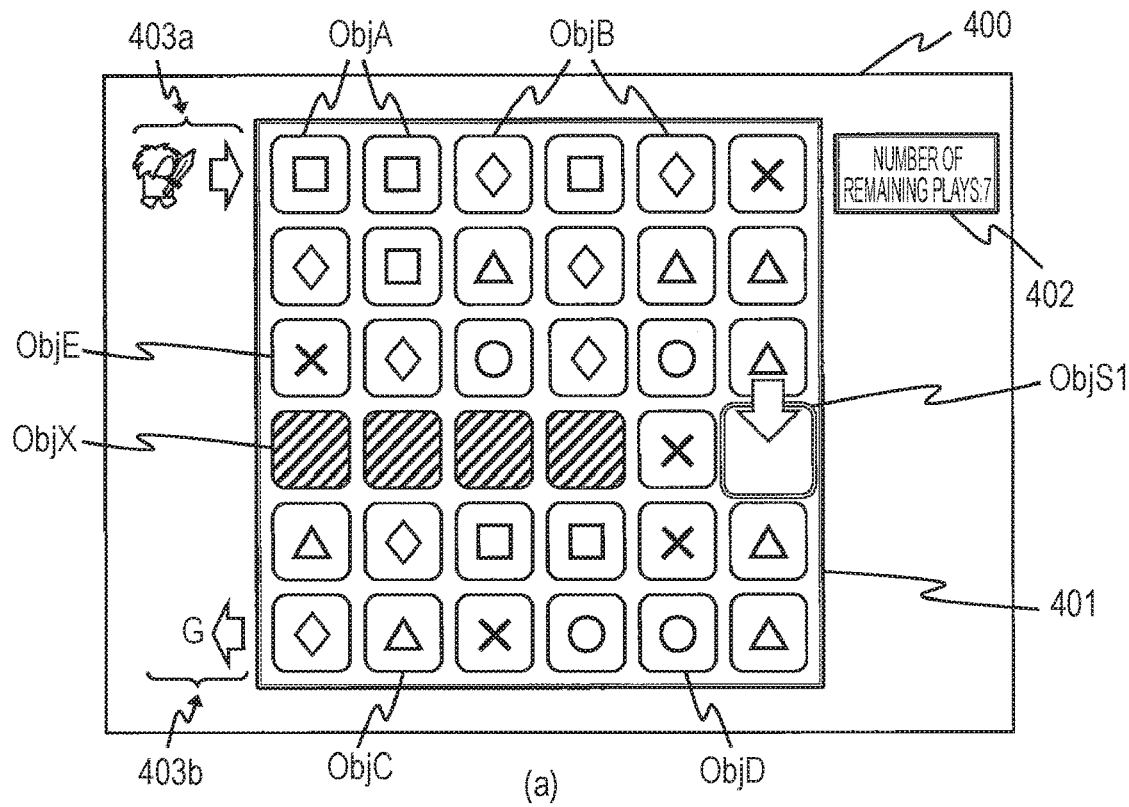
(a)
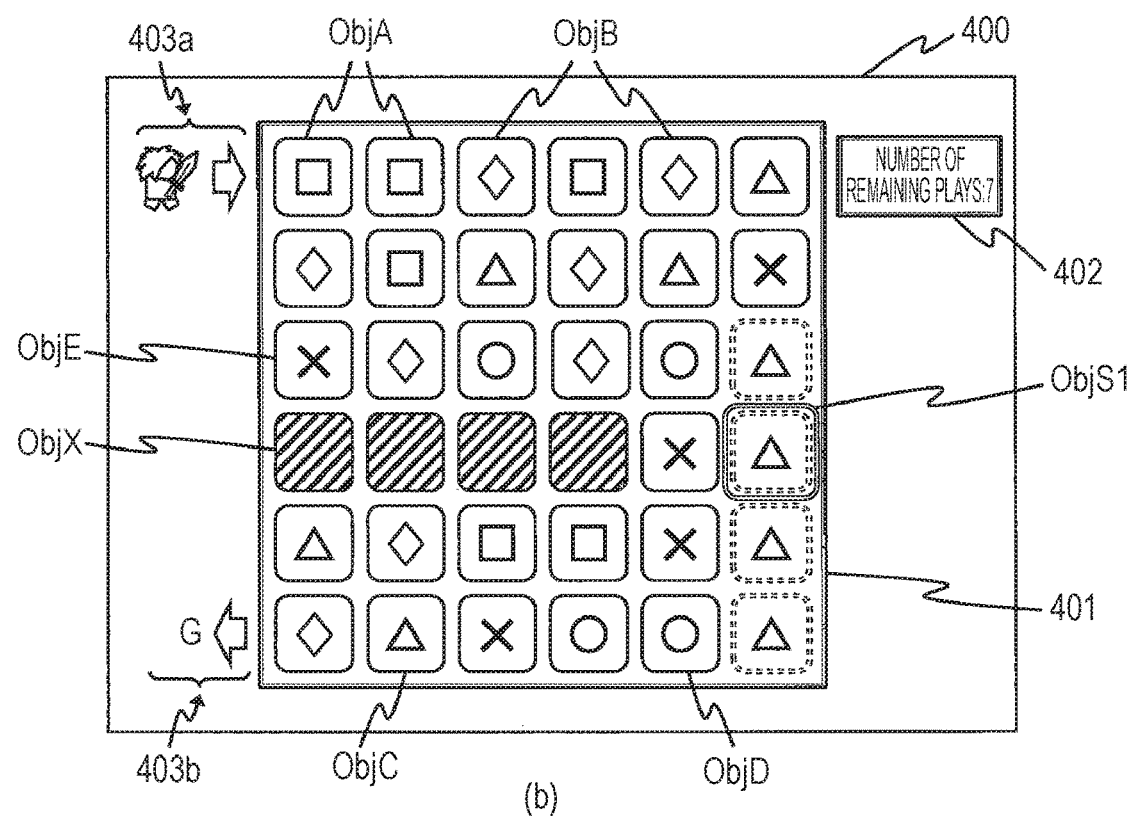
(b)

FIG.6
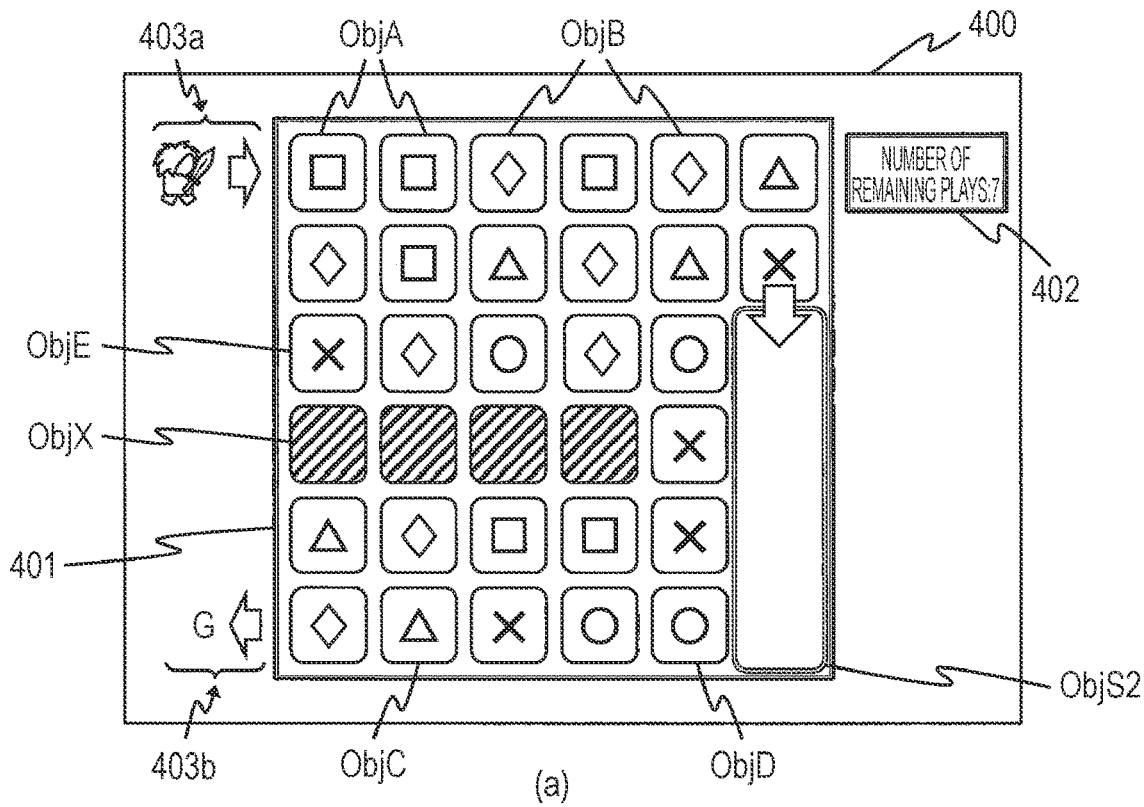
(a)
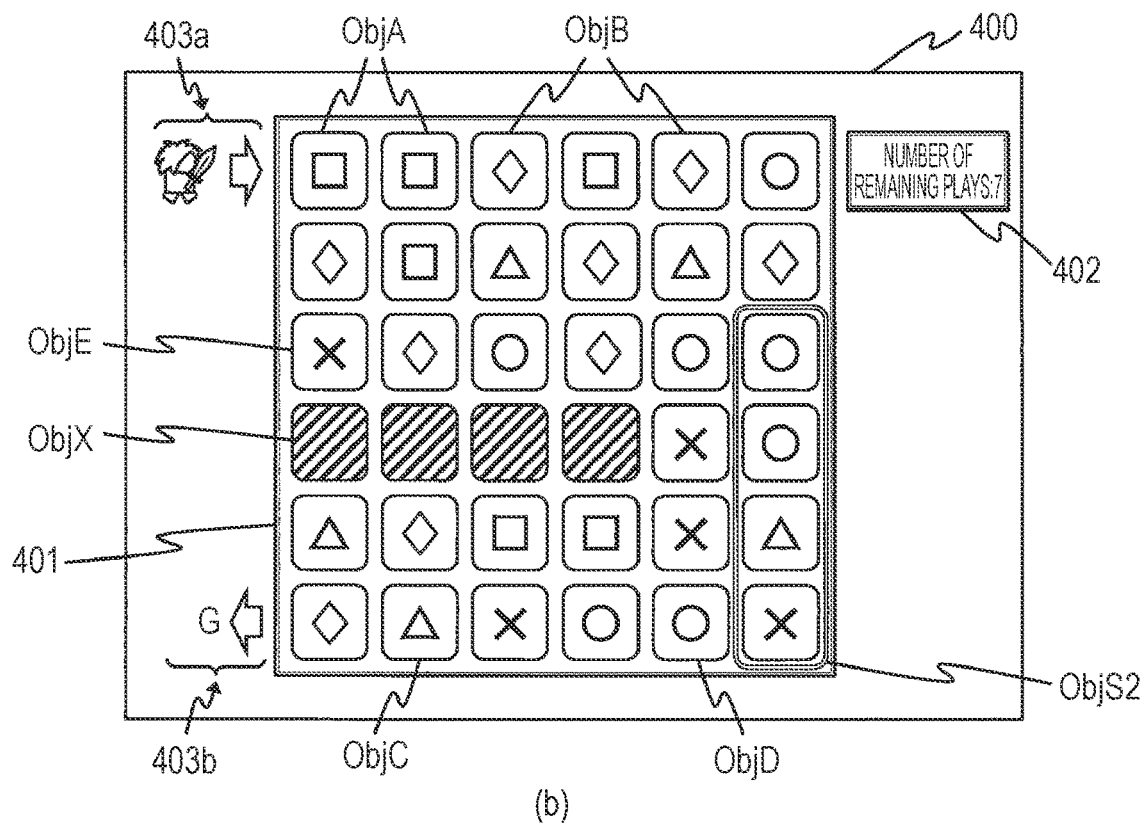
(b)

FIG.7
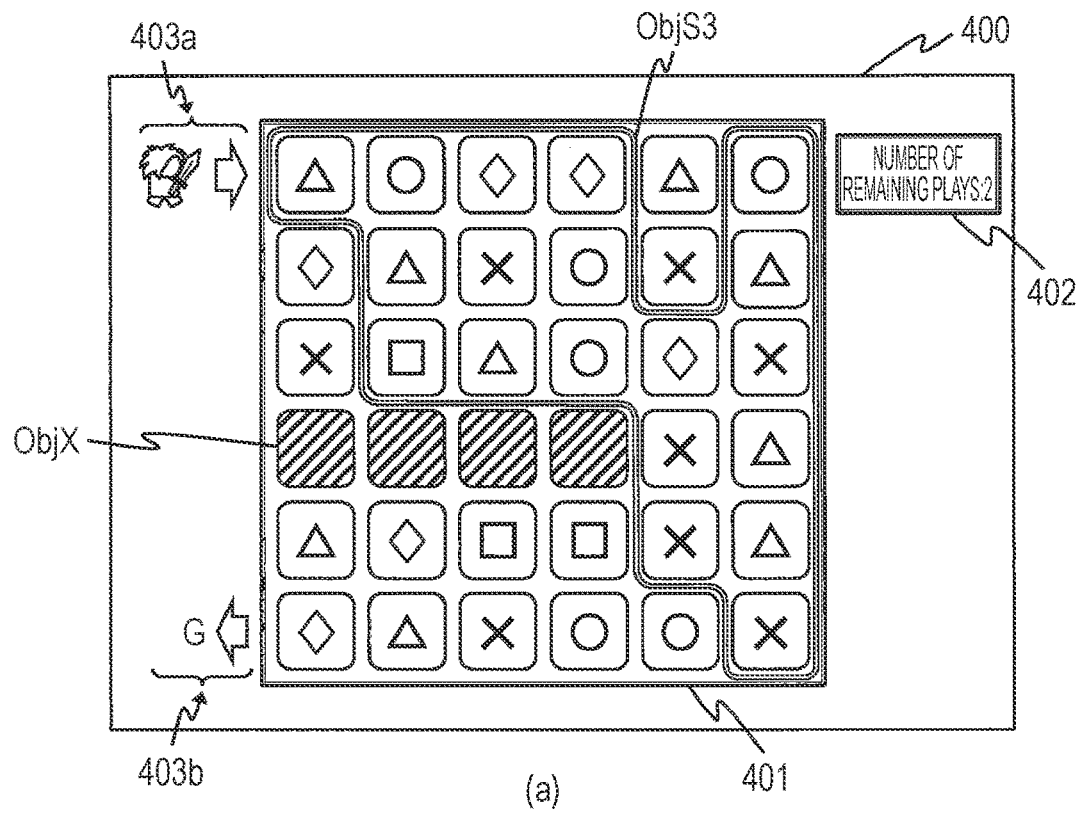
(a)
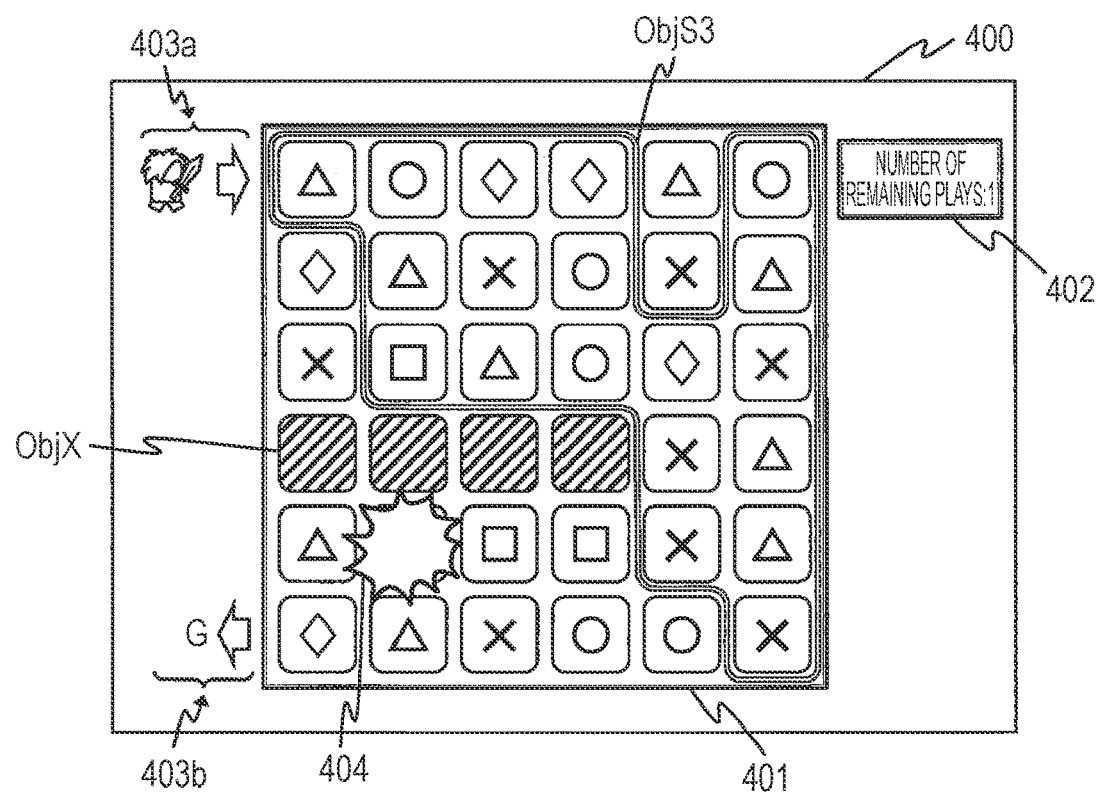
(b)

FIG.8
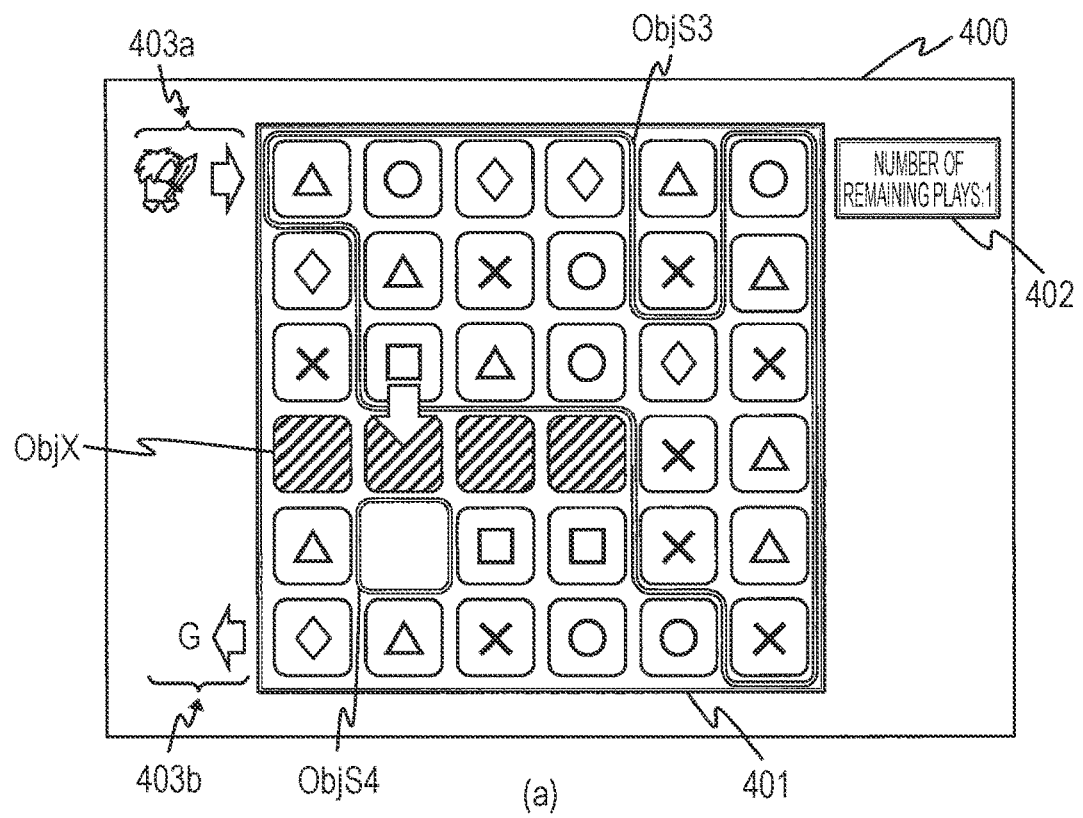
(a)
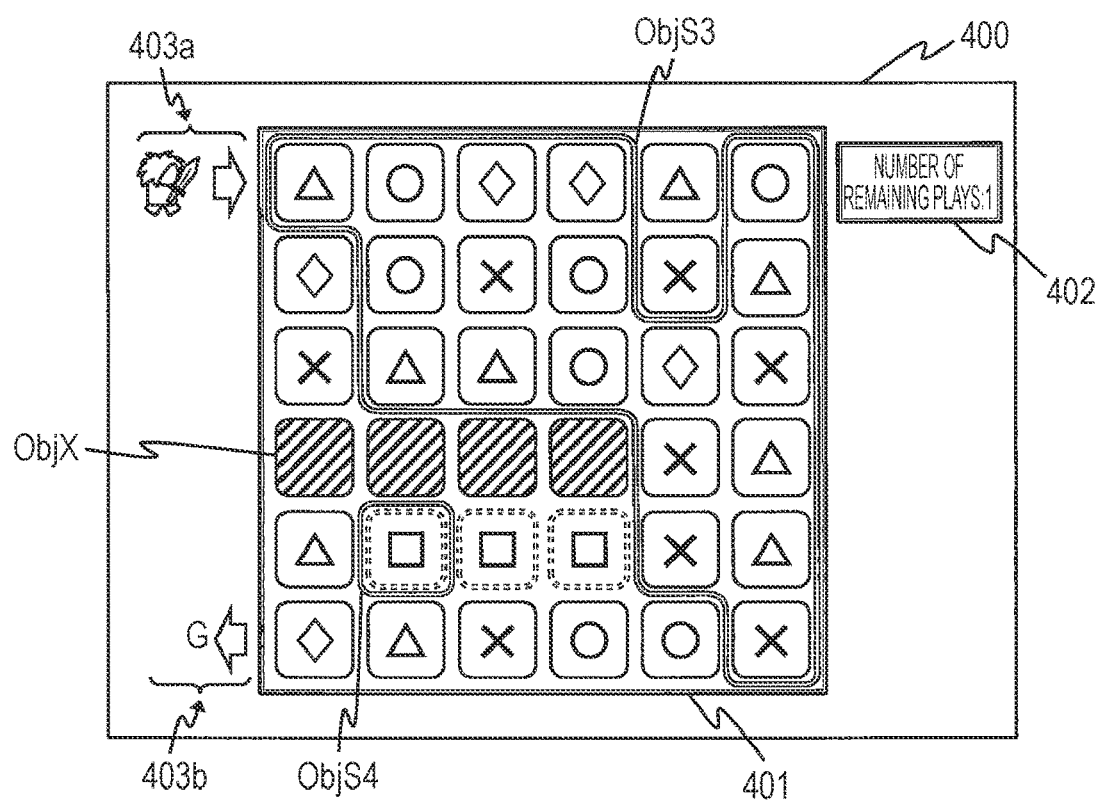
(b)

FIG.9
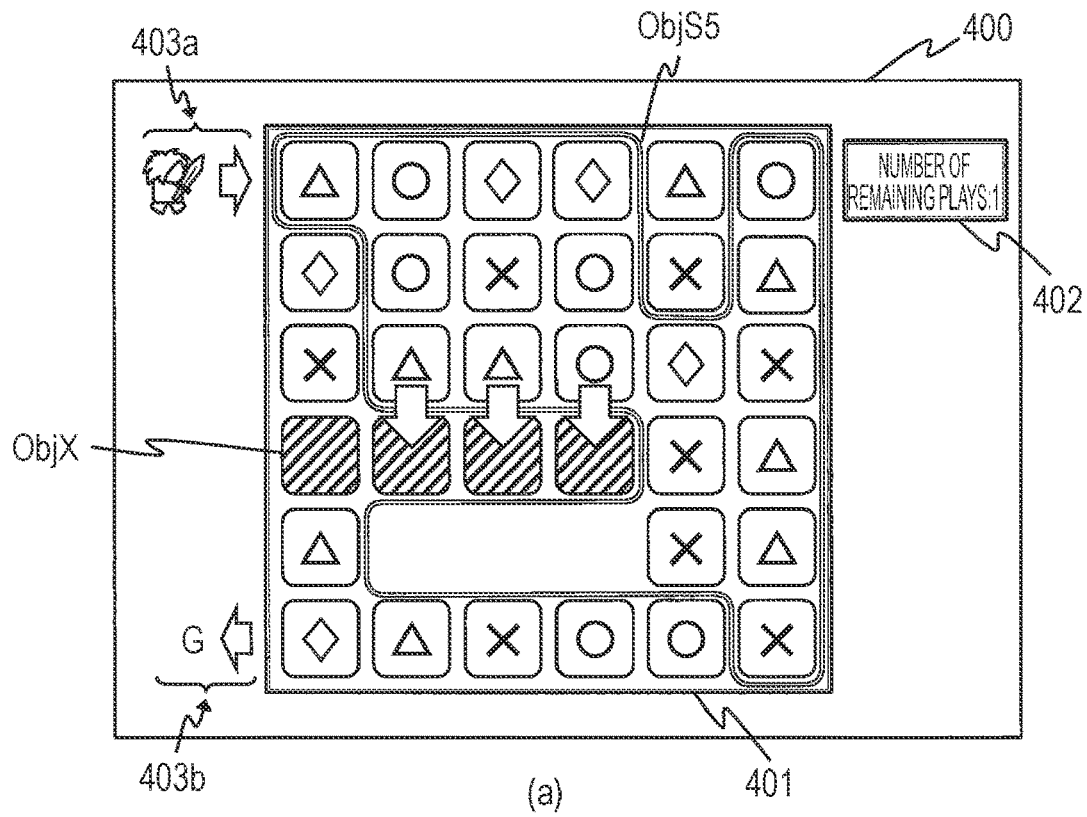
(a)
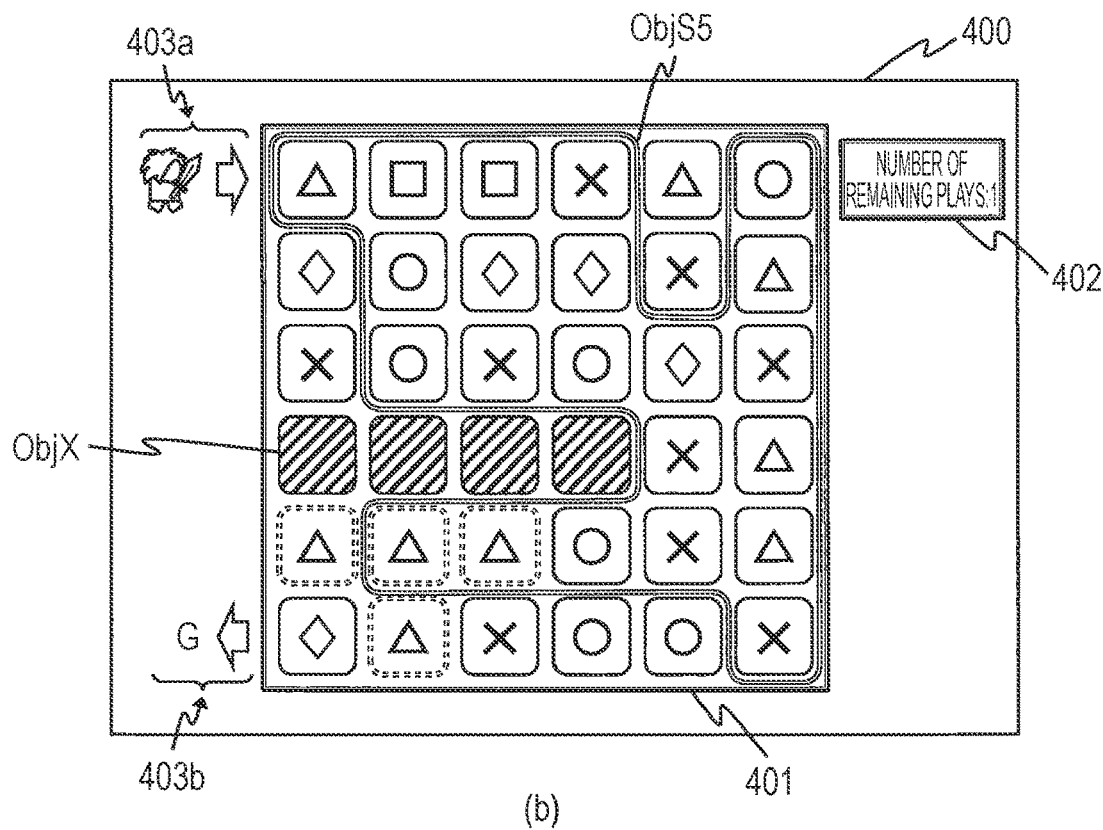
(b)

FIG.10
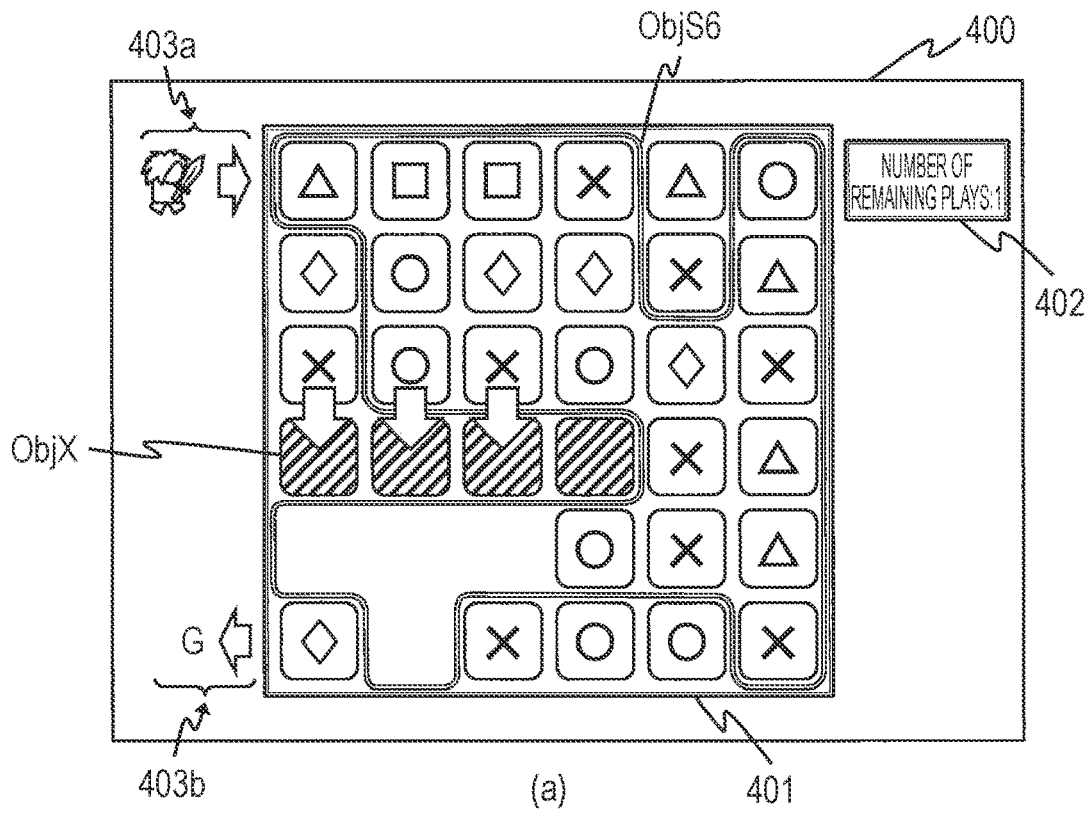
(a)
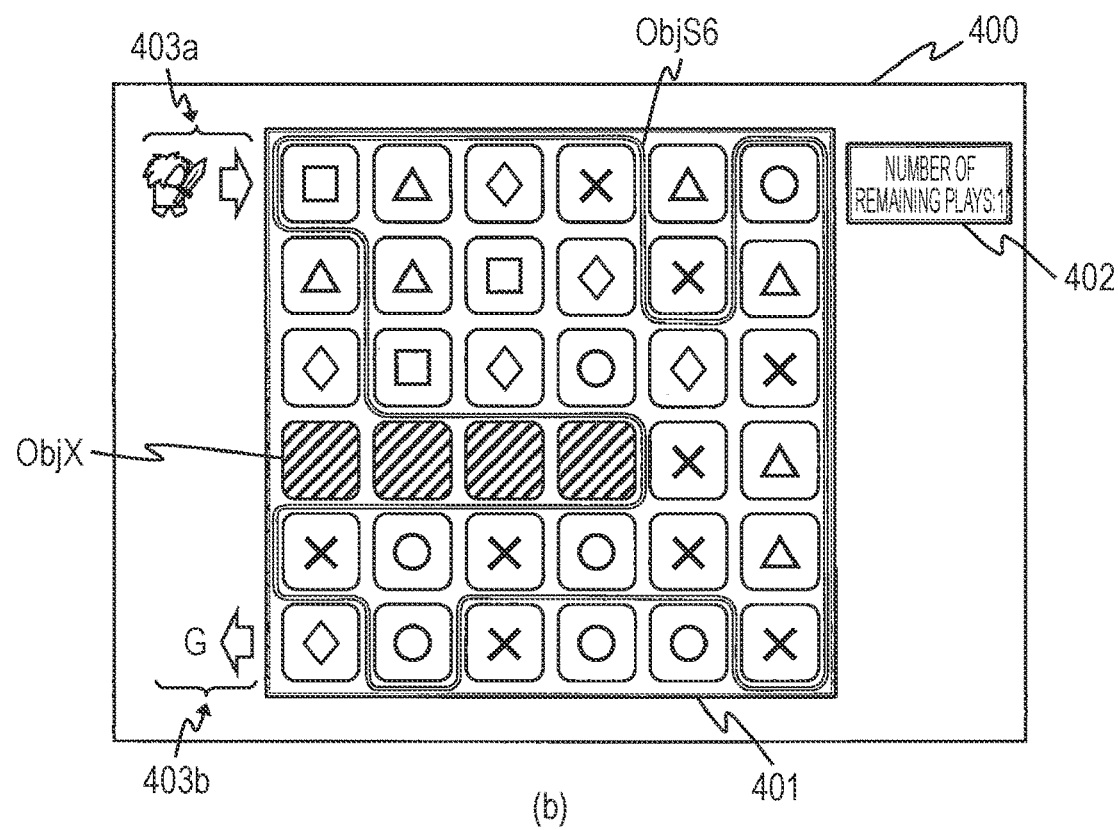
(b)

FIG.11
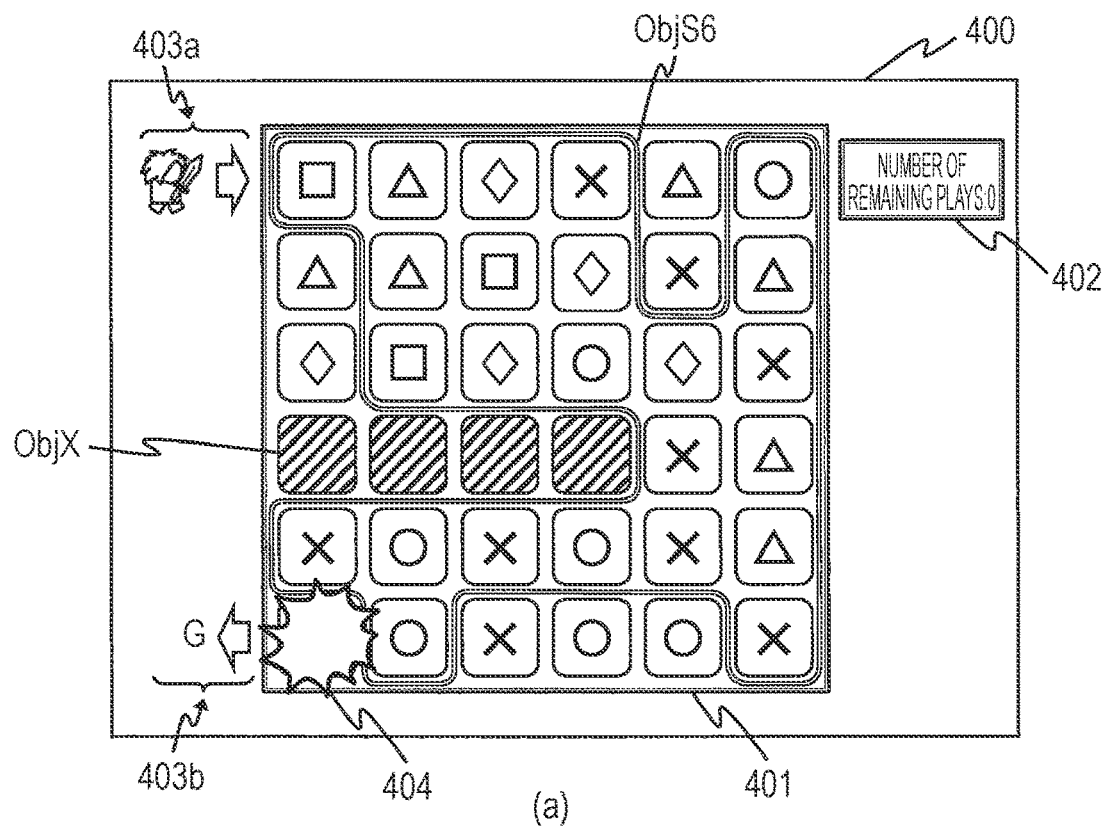
(a)
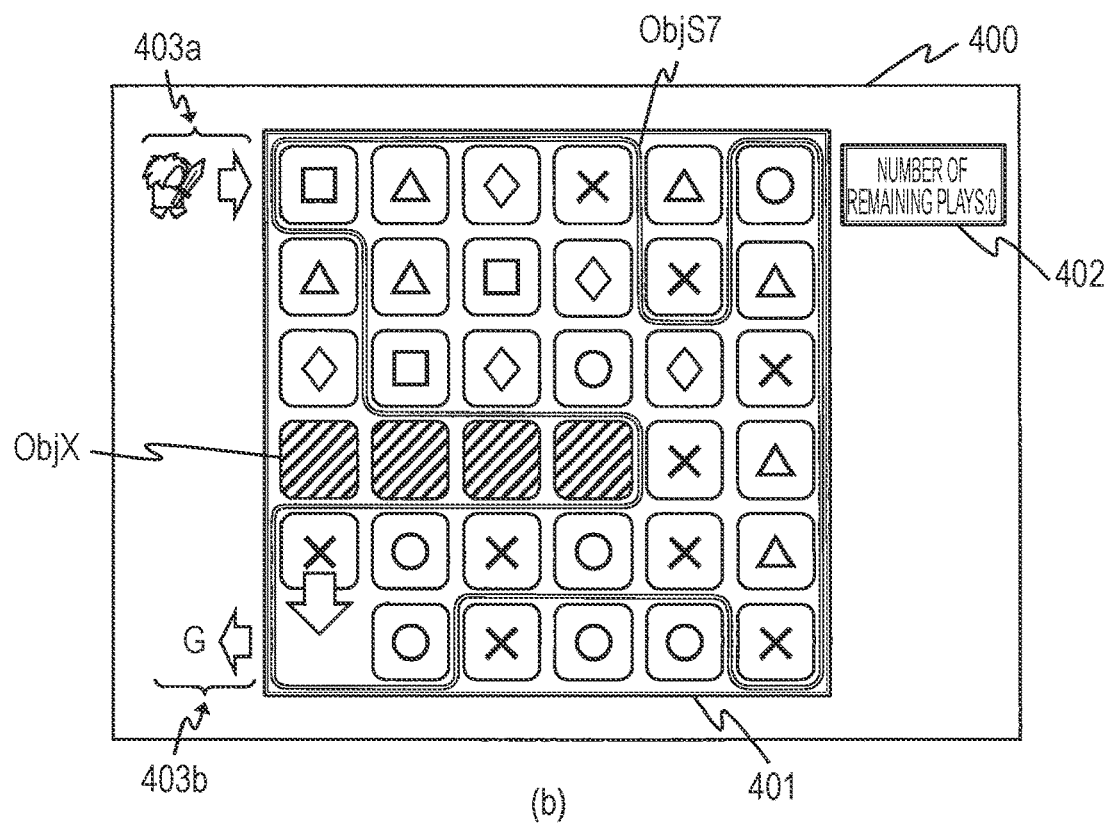
(b)

FIG.12
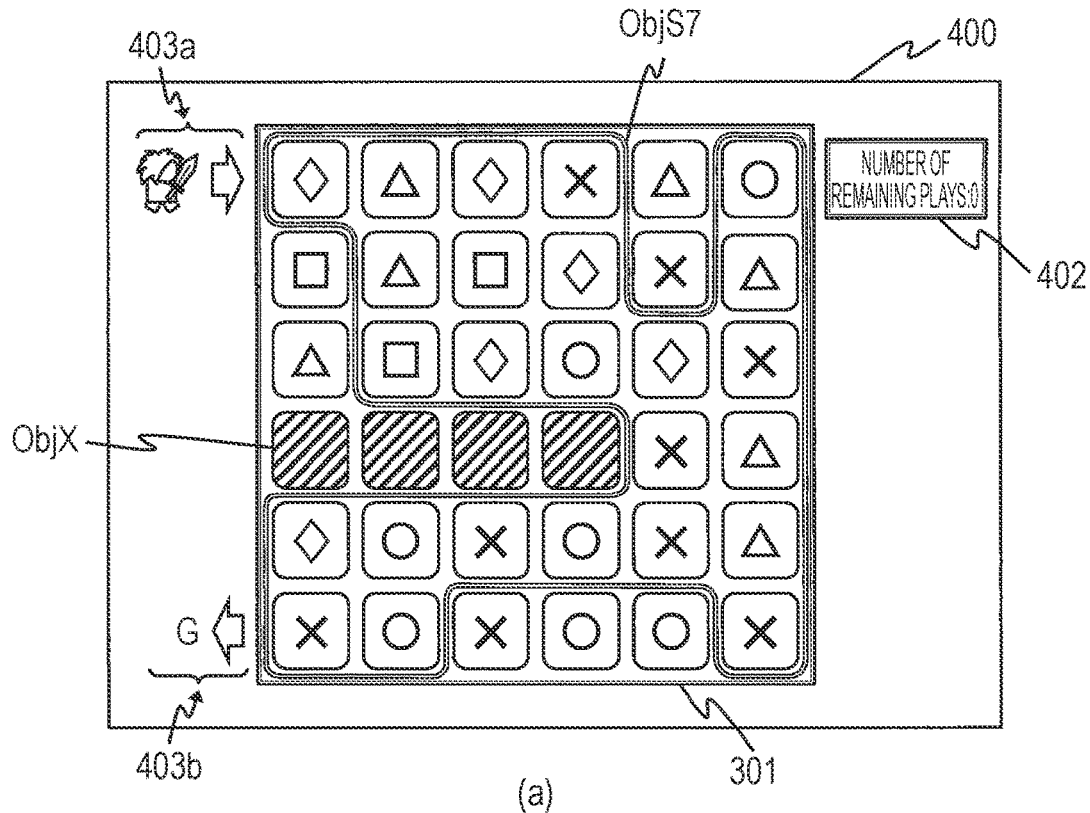
(a)
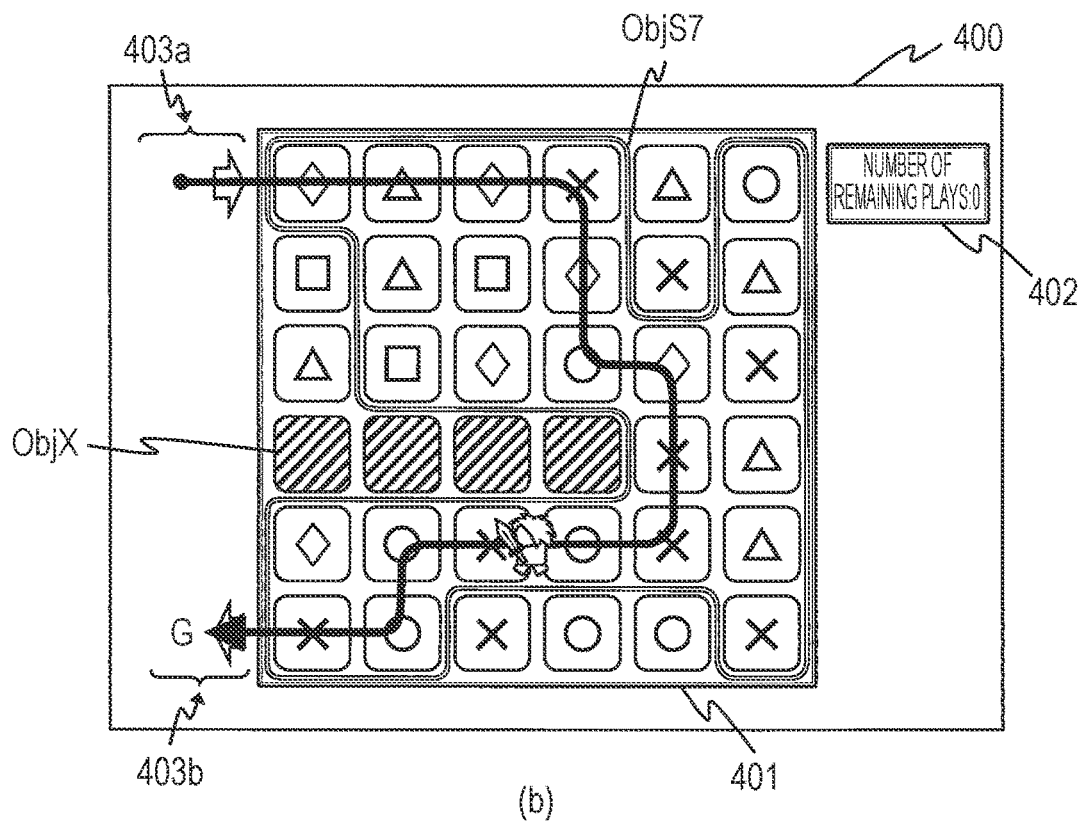
(b)

FIG.13

| OBJECT ID | OBJECT ATTRIBUTE | IMAGE | ... |
|-----------|------------------|-------|-----|
| ObjA | YELLOW | □ | ... |
| ObjB | RED | ◇ | ... |
| ObjC | BLUE | △ | ... |
| ObjD | GREEN | ○ | ... |
| ObjE | — | ✕ | ... |
| ObjX | — | ▨ | ... |
| ... | ... | ... | ... |

T1

GAME APPARATUS, CONTROL METHOD, AND CONTROL PROGRAM FOR USING A FIRST GAME TO DEFINE A PLAY AREA OF A SECOND GAME

FIELD

Embodiments provided herein relate to a game apparatus, a control method, and a control program.

BACKGROUND

In the past, game apparatuses have been provided in which a display form of a game object changes according to the operation of the player, and a game progresses on the basis of a game object whose display form is changed.

For example, a game apparatus that provides a puzzle game in which a plurality of blocks that can be arranged in a grid form are displayed, a predetermined number of blocks move according to an operation by a player, and displayed blocks satisfying a predetermined condition are erased (deleted) is disclosed in Patent Literature 1. In this game apparatus, other blocks which are adjacent to each other in a screen upward direction automatically move to the position of erased blocks by the operation of the player in a screen downward direction, and a process of determining whether or not a specified condition is satisfied is executed again after the blocks have moved.

In this game apparatus, the player can not only extinguish a displayed block by performing an operation of moving the block, but can also extinguish a displayed block based on the automatic movement of other blocks in the screen downward direction as a block is extinguished. As described above, this game apparatus can provide the players with games requiring advanced thinking.

Patent Literature 1, JP-A-2010-259455, provides such a technique.

SUMMARY

However, in the game apparatus of the related art, the game is developed exclusively on the basis of the game objects whose display forms are changed according to the operation of the player. For this reason, for a game requiring more advanced thinking to be provided to the player, it is necessary to change game specifications by increasing the type and/or number of displayed game objects or increasing the moving speed of the game objects.

In a case in which the game specifications are changed as described above, the usability of the user interface of the game apparatus is likely to deteriorate due to a reduction in input accuracy of the player associated with a reduction in the player's visibility of the game object, an increase in the type and/or number of game objects in the limited display area of the game apparatus, and/or an increase in moving speed. Further, such a change in the game specifications causes a problem of increased processing load on the game apparatus.

The embodiments as described herein were made to solve the above problems, and it is an object of the embodiments to provide the player with a user interface of realizing various game developments without degrading usability.

A game apparatus according to embodiments provided herein may be a game apparatus including a display unit including a display screen and a processing unit that causes a plurality of objects to be displayed on the display screen of the display unit, changes, in a case in which at least one object of the plurality of objects is operated by a player in a first game, a display form of at least the operated object and specifies an area corresponding to the object whose display form is changed, and may display, in a case in which a first condition related to the first game is satisfied, the specified area as a second game area used in a second game different from the first game.

Further, in the game apparatus according to embodiments provided herein, preferably, the first condition may be satisfied when at least the number of designations of the object by the player reaches a predetermined number.

Further, in the game apparatus according to embodiments provided herein, preferably, in a case in which the second game area is adjacent to another second game area, the processing unit may integrate the adjacent two second game areas into one second game area, and the first condition may be satisfied when at least one second game area may include a predetermined position used in the second game.

Further, in the game apparatus according to embodiments provided herein, preferably, the changing of the display form of the operated object may include deleting the operated object from the display screen.

Further, in the game apparatus according to embodiments provided herein, preferably, the processing unit may perform display control such that an object adjacent to the deleted object in a predetermined direction among the plurality of objects may be automatically moved to a position of the deleted object in the display screen.

Further, in the game apparatus according to embodiments provided herein, preferably, the processing unit may delete an object satisfying the second condition as the adjacent object may be moved from the display screen, and may display an area corresponding to the deleted object as the second game area.

Also, in the game apparatus according to embodiments provided herein, preferably, the object satisfying the second condition may be deleted from the display screen as the deleted object is automatically moved, and a predetermined parameter value may be increased according to the number of times that the second condition is satisfied consecutively.

Further, in the game apparatus according to embodiments provided herein, preferably, an attribute may be associated with each of the plurality of objects, and in a case in which a third condition relating to the predetermined parameter value is satisfied, the predetermined attribute may be changed to another attribute for an object associated with a predetermined attribute displayed on the display screen.

A control method according to embodiments provided herein may be a control method for a game apparatus including a display unit including a display screen and may include a step of causing a plurality of objects to be displayed on the display screen of the display unit, a step of changing, in a case in which at least one object of the plurality of objects may be operated by a player in a first game, a display form of at least the operated object and specifying an area corresponding to the object whose display form may be changed, and a step of displaying, in a case in which a first condition related to the first game may be satisfied, the specified area as a second game area used in a second game different from the first game.

A control program according to embodiments provided herein may be a control program of a game apparatus including a display unit including a display screen and causes the game apparatus to execute a step of causing a plurality of objects to be displayed on the display screen of the display unit, a step of changing, in a case in which at least one object of the plurality of objects is operated by a player in a first game, a display form of at least the operated object and specifying an area corresponding to the object whose display form is changed, and a step of displaying, in a case in which a first condition related to the first game is satisfied, the specified area as a second game area used in a second game different from the first game.

Advantageous Effects of the Embodiments

With the game apparatus, the control method, and the control program according to embodiments provided herein, it may be possible to provide the player with the user interface of realizing various game developments without degrading usability.

BRIEF DESCRIPTION OF THE DRAWINGS

FIG. 4 is a diagram illustrating an example of a screen displayed on a display unit 24 of the mobile terminal 2;

FIG. 5 is a diagram illustrating an example of a screen displayed on the display unit 24 of the mobile terminal 2;

FIG. 6 is a diagram illustrating an example of a screen displayed on the display unit 24 of the mobile terminal 2;

FIG. 7 is a diagram illustrating an example of a screen displayed on the display unit 24 of the mobile terminal 2;

FIG. 8 is a diagram illustrating an example of a screen displayed on the display unit 24 of the mobile terminal 2;

FIG. 9 is a diagram illustrating an example of a screen displayed on the display unit 24 of the mobile terminal 2;

FIG. 10 is a diagram illustrating an example of a screen displayed on the display unit 24 of the mobile terminal 2;

FIG. 11 is a diagram illustrating an example of a screen displayed on the display unit 24 of the mobile terminal 2;

FIG. 12 is a diagram illustrating an example of a screen displayed on the display unit 24 of the mobile terminal 2;

FIG. 13 is a diagram illustrating an example of a data structure of an object table T1;

DETAILED DESCRIPTION

Figure 1:
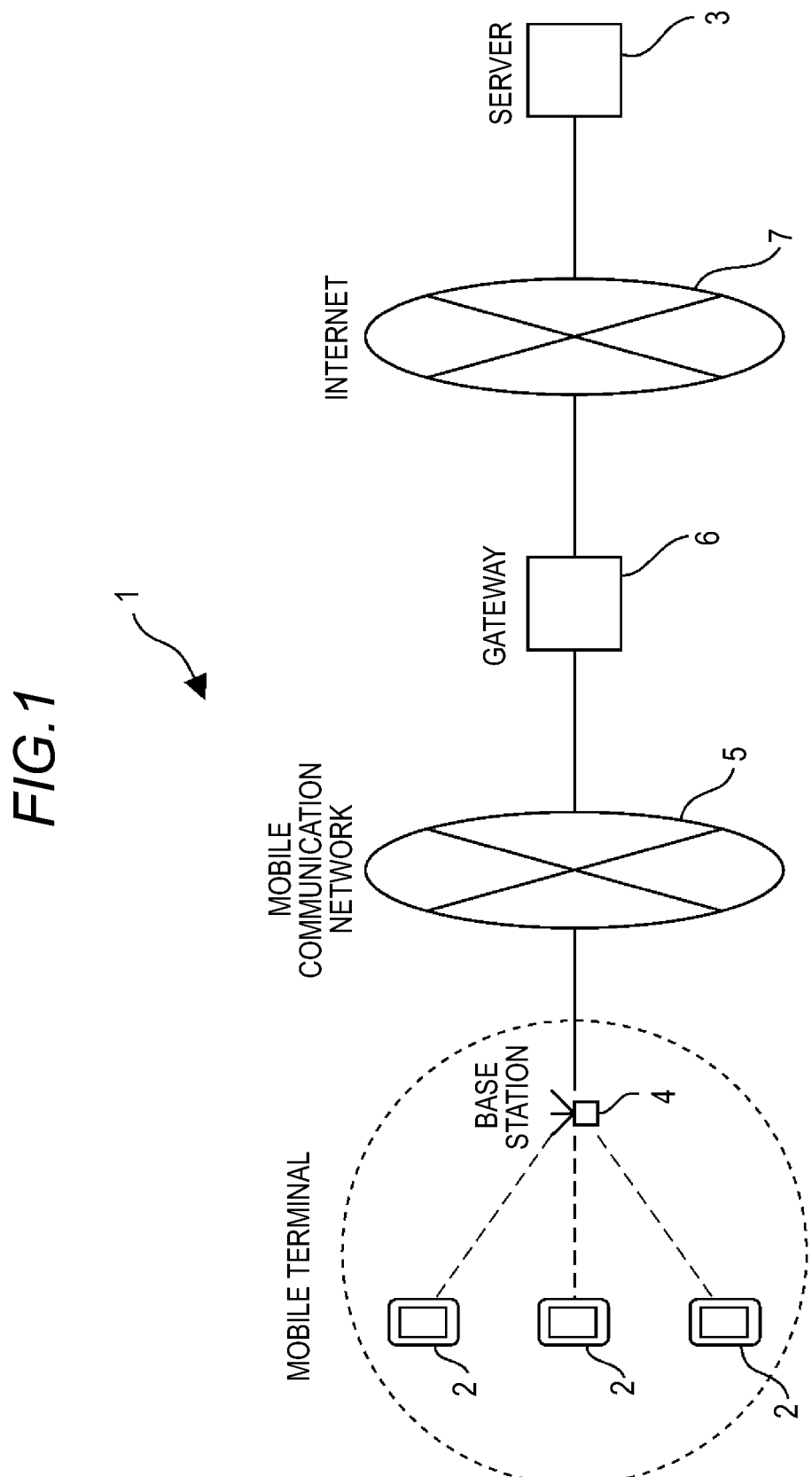
FIG. 1 is a diagram illustrating an example of a schematic configuration of a game system 1.

Hereinafter, various embodiments of embodiments provided herein will be described below with reference to the appended drawings. However, it should be noted that the technical scope of embodiments provided herein may not be limited to those embodiments, but extends to embodiments provided herein set forth in claims and their equivalents.

A game apparatus according to the present embodiment may be a mobile terminal such as a multifunctional mobile phone (a so-called "smartphone") owned by a player. The game apparatus can display a game field in which a plurality of objects are arranged on a display screen and cause a game using the game field to progress. An object may be a game element specified according to an input of the player, for example, a panel, a card, or a character. The game field may be a game space which is displayed on the display screen and used for arrangement of a plurality of objects. The following description will proceed with an example in which the game provided by the game apparatus is a puzzle game.

In the puzzle game provided by the game apparatus according to the present embodiment, in a case in which at least one object among a plurality of objects is designated according to the operation of the player on the game apparatus, the display form of the object designated by the player may be changed. The change in the display form of the designated object may be deletion (erasure) of the designated object. The deletion of the object may entail that the object is not placed in the game field, and the object may not be used in the game thereafter. The deletion of the object may be a transparent display in which a transparent color may be set for the object and a background color of the object may be combined with color information of the object. The display form of the designated object may be a change in the display color of the designated object.

The game apparatus may designate an area corresponding to the object whose display form has been changed as an additional game area used in an additional game different from the puzzle game. The additional game may be, for example, a game in which a game content such as a character that can move only in an additional game area may be automatically or manually moved from a predetermined start position to a goal position. The additional game may be various kinds of board games in which pieces can be placed only in the additional game area.

The game apparatus may end the puzzle game and starts the additional game in a case in which a game complete condition of the puzzle game may be satisfied. If the additional game starts, an additional game screen may be displayed.

As described above, in the game apparatus of the present embodiment, the additional game area used in the additional game different from the puzzle game may be determined according to an operation result of the player on the puzzle game, and the additional game area using the additional game area may be executed. Accordingly, the game apparatus of the present embodiment can provide an additional game corresponding to the operation result on the puzzle game to the player who plays the puzzle game. In other words, the game apparatus of the present embodiment can provide the player with a user interface of realizing various game developments without increasing the type and/or number of game objects or increasing the moving speed of the game object.

FIG. 1 illustrates an example of a schematic configuration of a game system 1.

The game system 1 may include a plurality of mobile terminals 2 operated by a plurality of players and a server 3. The mobile terminal 2 and the server 3 may be connected to each other via a communication network such as a base station 4, a mobile communication network 5, a gateway 6, and the Internet 7. Communication may be performed between the mobile terminal 2 and the server 3 on the basis of a prescribed communication protocol. The prescribed communication protocol may be, for example, a hypertext transfer protocol (HTTP).

The mobile terminal 2 may be an example of a game apparatus that provides a game, but the game apparatus may not be limited to the mobile terminal 2. For example, the server 3 may be used as a game apparatus. Also, the game system 1 including the mobile terminal 2 and the server 3 may be used as a game apparatus.

The mobile terminal 2 may be a multifunctional mobile phone. The mobile terminal 2 may be a mobile phone (so-called "feature phone"), a mobile information terminal (personal digital assistant (PDA)), a tablet terminal, a tablet personal computer (PC), or the like. The mobile terminal 2 may be a portable game machine, a portable music player, a laptop PC, or the like.

Figure 2:
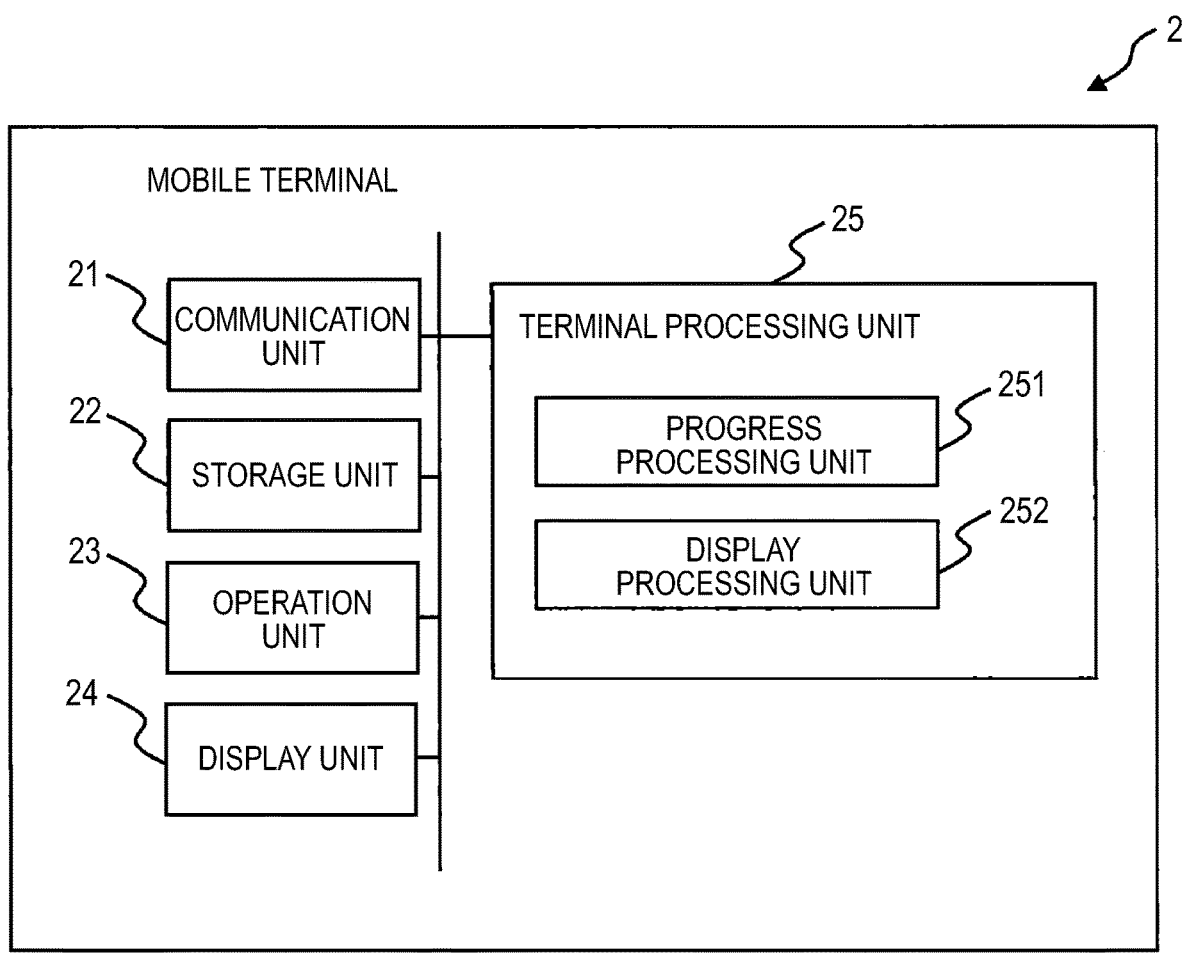
FIG. 2 is a diagram illustrating an example of a schematic configuration of a mobile terminal 2.

FIG. 2 may be a diagram illustrating an example of a schematic configuration of the mobile terminal 2.

The mobile terminal 2 may be connected to the server 3 via the base station 4, the mobile communication network 5, the gateway 6, and the Internet 7 and may perform communication with the server 3. The mobile terminal 2 may control the progress of the game according to the various kinds of instructions input by the player. Also, the mobile terminal 2 may receive various kinds of data from the server 3 and may display the game screen or the like. For that purpose, the mobile terminal 2 may include a communication unit 21, a storage unit 22, an operation unit 23, a display unit 24, and a terminal processing unit 25.

The communication unit 21 may include a communication interface circuit including an antenna having a predetermined frequency band as a sensitive band, and may connect the mobile terminal 2 to the communication network. The communication unit 21 may establish a wireless signal line such as a long term evolution (LTE) scheme with the base station 4 via a channel assigned by the base station 4, and may perform communication with the base station 4. A communication scheme between the communication unit 21 and the base station 4 may be a 5th generation (5G) mobile communication system or the like. Then, the communication unit 21 may transmit data supplied from the terminal processing unit 25 to the server 3. Also, the communication unit 21 may supply data received from the server 3 or the like to the terminal processing unit 25.

The storage unit 22 may include, for example, a semiconductor memory device such as a read only memory (ROM) and a random access memory (RAM). The storage unit 22 may store an operating system program, a driver program, an application program, data, or the like used for processing in the terminal processing unit 25. The driver program stored in the storage unit 22 may be a wireless communication device driver program that may control the communication unit 21, an input device driver program that may control the operation unit 23, and an output device driver program that may control the display unit 24. The application program stored in the storage unit 22 may be a control program or the like that may control the mobile terminal 2 in order to realize the progress of the game. The data stored in the storage unit 22 include various kinds of game data (an object table T1, a game field table T2, an object image, game progress data, or the like to be described later) used when the game may be executed, identification data (for example, a player identification (ID)) uniquely identifying the player playing the game or the like. Also, the storage unit 22 may temporarily store data related to a predetermined process.

The operation unit 23 may be a pointing device such as a touch panel. The operation unit 23 may be an input key or the like. The player can input letters, numbers, and symbols using the operation unit 23, the position on the display screen of the display unit 24, or the like. In a case in which the operation unit 23 is operated by the player, the operation unit 23 may generate a signal corresponding to that operation. Then, the generated signal may be supplied to the terminal processing unit 25 as an instruction of the player.

The display unit 24 may be a liquid crystal display. The display unit 24 may be an organic electro-luminescence (EL) display or the like. The display unit 24 may display an image corresponding to image data supplied from the terminal processing unit 25, an image corresponding to the image data, or the like.

The terminal processing unit 25 may be one or more processors that operate according to a computer program (software), or one or more dedicated hardware circuits for executing at least some of various kinds of processes, or a circuitry including a combination thereof. The terminal processing unit 25 centrally may control an overall operation of the mobile terminal 2, and may be, for example, a central processing unit (CPU). The terminal processing unit 25 may execute various kinds of information processing through an appropriate procedure on the basis of various kinds of instructions or the like input according to the program stored in the storage unit 22 and the operation of the operation unit 23 by the player, and may control the operation of the communication unit 21 or the display unit 24. The terminal processing unit 25 may execute various kinds of information processing on the basis of the operating system program, the driver program, and the application program stored in the storage unit 22. Also, the terminal processing unit 25 can execute a plurality of programs in parallel.

The terminal processing unit 25 may include at least a progress processing unit 251 and a display processing unit 252. Each of these components may be a functional module which may be implemented by a program executed by a processor included in the terminal processing unit 25. Alternatively, each of these components may be implemented in the mobile terminal 2 as firmware.

Figure 3:
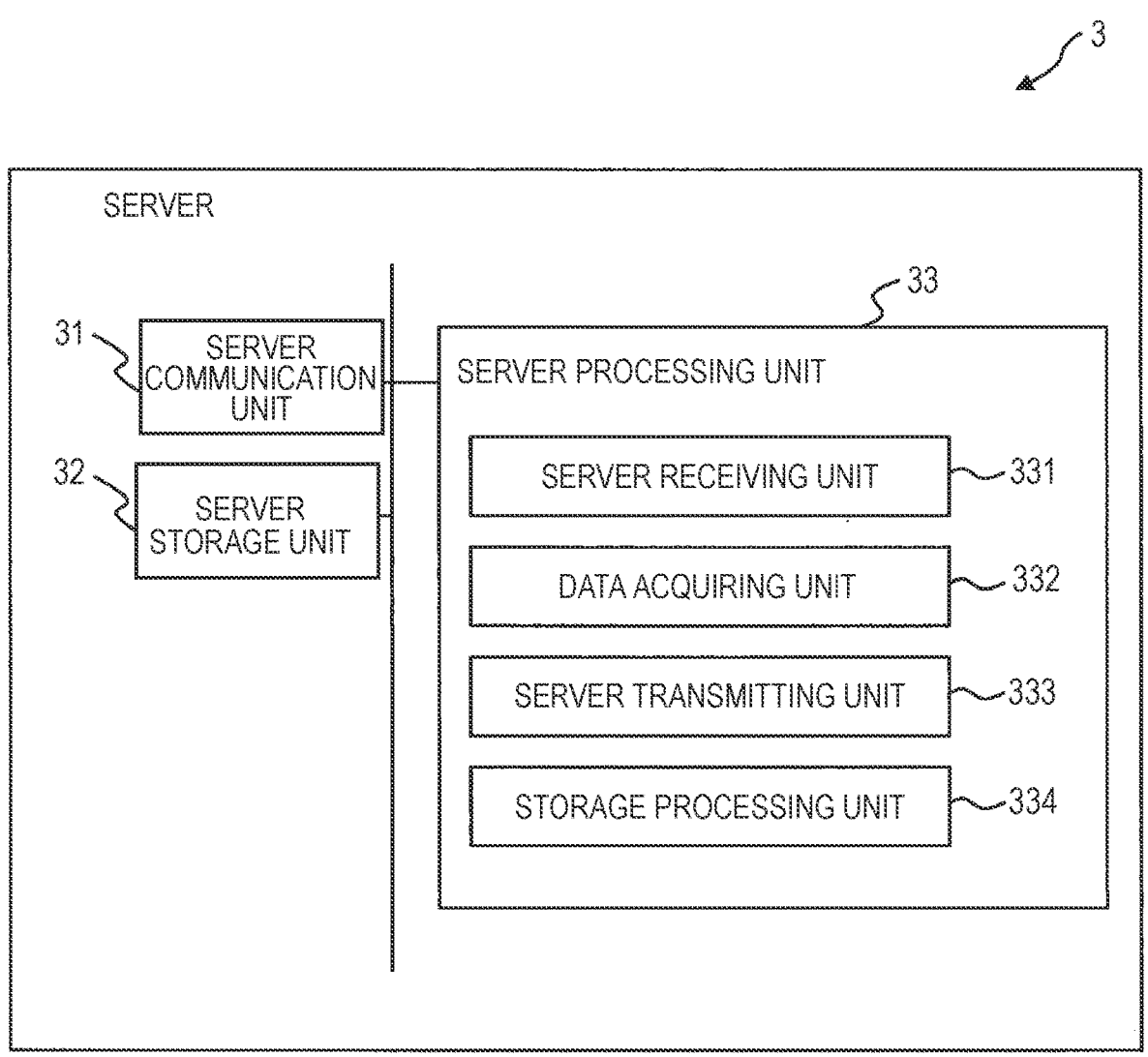
FIG. 3 is a diagram illustrating an example of a schematic configuration of a server 3.

FIG. 3 illustrates an example of a schematic configuration of the server 3.

The server 3 may manage various kinds of information used in the game according to instructions from the mobile terminal 2. Also, the server 3 may transmit various kinds of game data or the like used in the game to the mobile terminal 2. To this end, the server 3 may include a server communication unit 31, a server storage unit 32, and a server processing unit 33.

The server communication unit 31 may include a communication interface circuit for connecting the server 3 with the Internet 7, and may perform communication via the Internet 7. The server communication unit 31 may supply data received from the mobile terminal 2 or the like to the server processing unit 33 and may transmit data supplied from the server processing unit 33 to the mobile terminal 2 or the like.

The server storage unit 32 may include, for example, at least one of a magnetic tape device, a magnetic disc device, and an optical disc device. The server storage unit 32 may store the operating system program, the driver program, application programs, data, or the like used in the processing in the server processing unit 33. The application program stored in the server storage unit 32 may be game programs or the like that manage various kinds of game information for each mobile terminal 2 according to various kinds of instructions from each mobile terminal 2. The computer program stored in the server storage unit 32 may be installed in the server storage unit 32 from a portable computer-readable recording medium such as, for example, a CD-ROM or a DVD-ROM using a well-known setup program or the like.

The data stored in the server storage unit 32 may include game progress data of each player (data related to a game result, identification data identifying a game stage that the player has already played and completed, and the like), and the like. Also, the server storage unit 32 may store various kinds of game data (an object table T1, a game field table T2, image data of objects, and the like), and the like related to the progress of the game. Further, the server storage unit 32 may temporarily store data related to a predetermined process. In other words, the server storage unit 32 may include a volatile memory (a random access memory (RAM)) and store dynamic data that varies according to the progress of the game.

The server processing unit 33 may be configured as a circuitry including one or more processors that operate according to a computer program (software), one or more dedicated hardware circuits that execute at least some of various kinds of processes, or a combination thereof. The server processing unit 33 may control an overall operation of the server 3 in general, and may be, for example, a CPU. The server processing unit 33 may execute various kinds of information processing through an appropriate procedure on the basis of various kinds of instructions or the like from a program or the like stored in the server storage unit 32, and may control the operation of the server communication unit 31. The server processing unit 33 may execute various kinds of information processing on the basis of the operating system program, the driver program, the application program stored in the server storage unit 32. Also, the server processing unit 33 can execute a plurality of programs in parallel.

The server processing unit 33 may include at least a server receiving unit 331 and a storage processing unit 334. Each of these components may be a functional module implemented by a program executed by a processor included in the server processing unit 33. Alternatively, each of these components may be implemented on the server 3 as firmware.

The terminal processing unit 25 of the mobile terminal 2 and the server processing unit 33 of the server 3 will be described below with reference to game screens illustrated in FIGS. 4 to 12 and tables illustrated in FIGS. 13 to 14.

FIG. 4(a) may be a diagram illustrating an example of a game screen 400 displayed on the display unit 24 of the mobile terminal 2.

The game screen 400 may be displayed, for example, when a control program (for example, the game application program) for executing the game in the present embodiment may be activated in response to a start indication input by the operation of the operation unit 23 by the player. The game screen 400 may be displayed when an instruction to start a game of a new game stage may be given after a game of another game stage may end. An example of a display process of the game screen 400 when the game application program may be activated will be described below.

For example, in a case in which an activation icon or the like (not illustrated) indicating the game application program displayed on the display unit 24 may be designated by the operation of the operation unit 23 by the player, the start indication may be input from the operation unit 23 to the progress processing unit 251. If the start indication may be retrieved from the operation unit 23, the progress processing unit 251 may read and execute the game application program stored in the storage unit 22.

If the game application program is executed according to the start indication input according to the operation of the operation unit 23 by the player, the progress processing unit 251 may retrieve a player ID from the storage unit 22. The progress processing unit 251 may transmit a data request including the retrieved player ID to the server 3 via the communication unit 21. The server receiving unit 331 of the server 3 may receive the data request transmitted from the mobile terminal 2 via the server communication unit 31.

A data acquiring unit 332 of the server 3 may retrieve the game progress data of the player stored in the server storage unit 32 on the basis of the player ID included in the data request received by the server receiving unit 331. The data acquiring unit 332 may identify one of the game stages that the player has not yet played on the basis of the retrieved game progress data, and may retrieve the game field table T2 of the one game stage from the server storage unit 32.

A server transmitting unit 333 of the server 3 may transmit the game field table T2 retrieved by the data acquiring unit 332 and the object table T1 and the image data of the object stored in the server storage unit 32 to the mobile terminal via the server communication unit 31. The progress processing unit 251 of the mobile terminal 2 may receive the object table T1, the game field table T2, and the image data of the object transmitted from the server 3 via the communication unit 21, and may store them in the storage unit 22.

The display processing unit 252 of the mobile terminal 2 may display the game screen 400 on the display unit 24 on the basis of the object table T1, the game field table T2, and the image data of the object stored in the storage unit 22. A game field 401, the number of remaining plays 402, a start indication 403a, a goal indication 403b, and the like may be displayed on the game screen 400 illustrated in FIG. 4(a).

In the game field 401, a plurality of objects ObjA, ObjB, ObjC, ObjD, ObjE, and ObjX may be arranged on the basis of the object table T1, the game field table T2, and the image data of the object.

The number of remaining plays 402 may be information indicating the number of times that the player can perform operations on a plurality of objects displayed in the game field 401. In the example illustrated in FIG. 4(a), the player can input eight object designation instructions when the game starts.

The start indication 403a may be information indicating a start position used in an additional game described later. In the example illustrated in FIG. 4(a), the position of the object arranged at the left top corner among the plurality of objects arranged in the game field 401 serves as the start position. The start indication 403a may include the image of the game content.

The goal indication 403b may be information indicating a goal position used in the additional game to be described later. In the example illustrated in FIG. 4(a), the position of the object arranged on the bottom left corner among a plurality of objects arranged in the game field 401 may serve as the goal position.

The display process of the game screen 400 when the game application program is started has been described above, and an example of data structures of the object table T1 and the game field table T2 stored in the storage unit 22 and the server storage unit 32 will be described below with reference to FIGS. 13 and 14.

Figure 13:
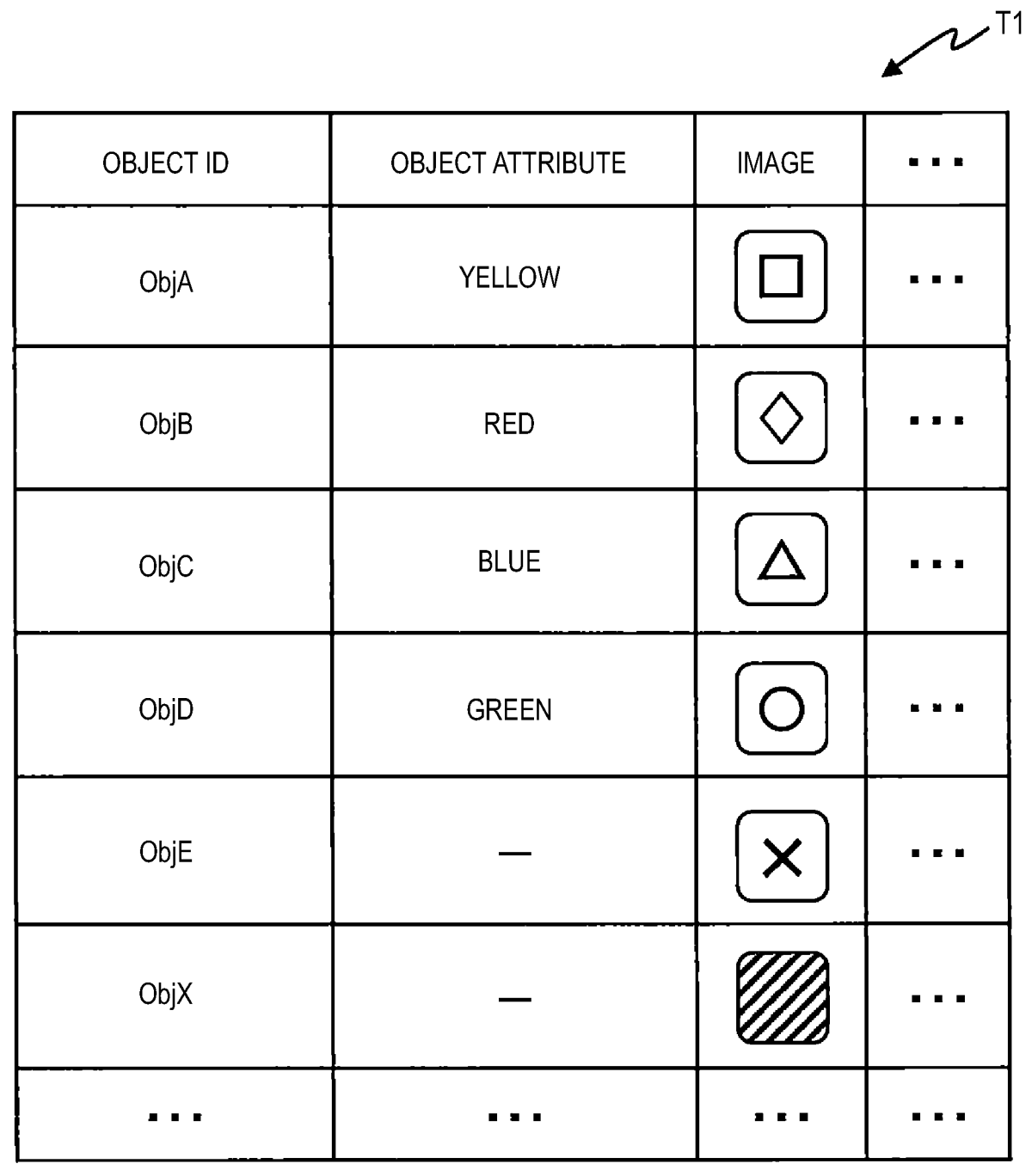

FIG. 13 illustrates an example of the data structure of the object table T1 for managing various kinds of objects displayed in the game screen 400. An object ID, an object attribute, an image data, and the like may be stored in the object table T1 for each object in association with each other.

The object ID may be an example of identification data uniquely identifying each object. The object attribute may be data indicating an attribute of each object. For example, in the example illustrated in FIG. 13, attribute data indicating colors such as "yellow," "red," "blue," and "green" may be stored as the object attribute. The object attribute may include data indicating "water," "fire," "lightning," "earth," or the like. The image data may be image data indicating each object and may be displayed in the game field 401 of the game screen 400.

Figure 14:
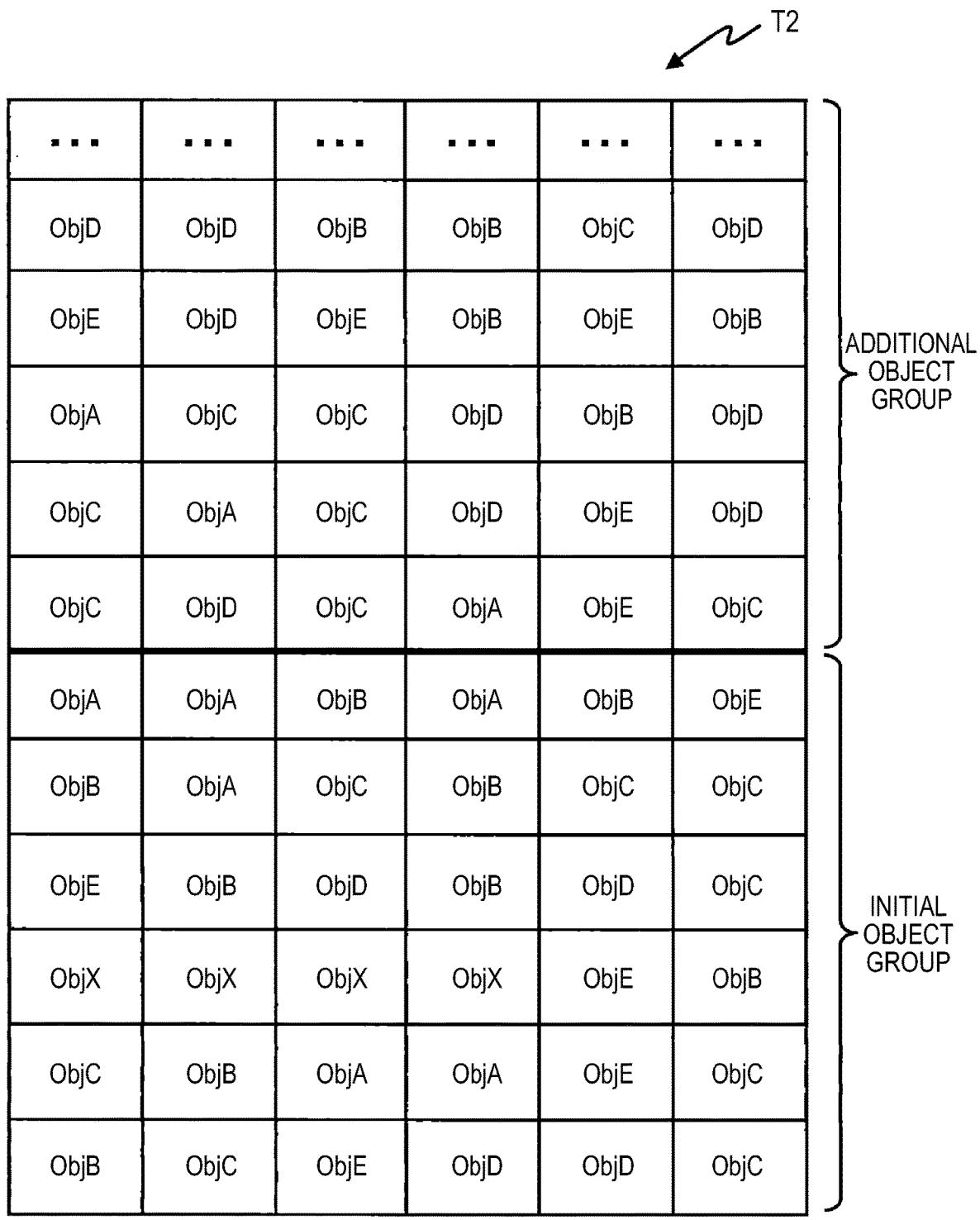
FIG. 14 is a diagram illustrating an example of a data structure of a game field table T2.

FIG. 14 illustrates an example of a data structure of the game field table T2 for managing the game fields. The game field table T2 may be stored for each game stage. For example, in a case in which a game having ten game stages may be provided from the server 3 to the mobile terminal 2, ten game field tables T2 corresponding to the ten game stages may be stored in the server storage unit 32.

The game field table T2 may store an initial object group including object IDs of a plurality of objects arranged in the game field 401 when the game starts and an additional object group including object IDs of a plurality of objects appearing in the game field according to the progress of the game in accordance with the arrangement in the game field 401.

If a game of a new game stage is started, the display processing unit 252 may retrieve the object IDs of a plurality of objects constituting the initial object group from the game field table T2 stored in the storage unit 22. Then, the display processing unit 252 may retrieve the image data of the object corresponding to each of a plurality of retrieved object IDs with reference to the object table T1. Then, the display processing unit 252 arranges each piece of retrieved image data in the game field 401 according to the arrangement of the object IDs of the initial object group. Accordingly, the game screen 400 illustrated in FIG. 4(*a*) may be displayed.

FIG. 4(*b*) is a diagram illustrating an example of the game screen 400 in a case in which the object designation instruction corresponding to the operation of the operation unit 23 by the player is retrieved. For example, in a case in which the operation unit 23 is a touch panel and the position on the display screen of the display unit 24 tapped by the player is one of a plurality of objects arranged in the game field 401, the progress processing unit 251 may retrieve information indicating the position of the object corresponding to the tap position of the player as the object designation instruction. The position of the object indicated by the object designation instruction need not necessarily be the tap position by the tap operation of the player and may be, for example, a position of an object existing in a predetermined figure in a case in which the player draws the predetermined figure.

As illustrated in FIG. 4(*b*), the display processing unit 252 may display a designation marker 404 centered on the tap position of player, and may display "7" obtained by subtracting "1" time from "8" times as the number of times indicated by the number of remaining plays 402. The display processing unit 252 may not display the designation marker 404 in a case in which the player taps the position on the display screen of the display unit 24.

FIG. 5(*a*) is a diagram illustrating an example of the game screen 400 which may reflect the acquisition of the object designation instruction.

The display processing unit 252 may delete the object corresponding to the object designation instruction from the game field 401. Then, the display processing unit 252 may display an additional game area ObjS1 corresponding to the deleted object. The additional game area ObjS1 may include a range of the same position and the same shape as the deleted object, and may not include an area corresponding to an object that has never been deleted since the game started. In the example illustrated in FIG. 5(*a*), since the object which may be the rightmost object and the fourth object from the top has been deleted since the game started, the additional game area ObjS1 has not included the range of the same position and the same shape as other objects other than the object.

The display processing unit 252 may display movement of one or more objects adjacent to the deleted object in a predetermined direction. In the example illustrated in FIG. 5(*a*), three objects arranged above the deleted object in a screen upward direction may move in a screen downward direction. In other words, in the game field 401, an object which may be the rightmost object and the third object from the top moves to the position of the deleted object, an object which may be the rightmost object and the second object from the top may move to a position which may be the rightmost position and the third position from the top, and the object on the top right corner may move to a position which may be the rightmost position and the second position from the top.

An object that does not move in the screen downward direction with the deletion of the object may be included among a plurality of objects arranged in the game field 401. For example, as will be described later, an object with an object ID "ObjX" may not move and remain at its arranged position even when the object below its arranged position in the screen downward direction may be deleted. Accordingly, the object with the object ID "ObjX" has a function as an obstacle, and it may be possible to change the difficulty level of the game according to the arrangement of such an object.

Then, the display processing unit 252 may retrieve the object IDs of a plurality of objects constituting the additional object group from the game field table T2 of the game being executed stored in the storage unit 22. The display processing unit 252 may retrieve an object ID of an object (ObjC in the example illustrated in FIG. 14) which may be the rightmost object which is not displayed in the game field 401 among a plurality of retrieved object IDs and may be an object (arranged in the lowest position) closest to the initial object group.

The display processing unit 252 may retrieve the image data of the object corresponding to one retrieved object ID with reference to the object table T1, and may arrange the retrieved image data at the top right corner position of the game field 401. The display processing unit 252 may display the retrieved image data so that it may move from the top side of the game field 401 in the screen downward direction. Accordingly, it may be possible to provide the player with the effect that the object drops from the top as if the deleted object were filled.

An example of an automatic object change process executed in response to the movement of the object according to the object designation instruction will be described with reference to FIG. 5(*b*), FIG. 6(*a*), and FIG. 6(*b*).

FIG. 5(*b*) is a diagram illustrating an example of the game screen 400 after the object is moved according to the object designation instruction. The progress processing unit 251 may determine that objects which are the rightmost objects and the first to fourth objects from the bottom in the game field 401 may satisfy an automatic change condition with the movement of the object according to the object designation instruction.

For example, the automatic change condition may be satisfied when a predetermined number (for example, three) or more objects of the same type are vertically or horizontally adjacent to each other. For example, the objects of the same type have the same object ID. The objects of the same type may have the same attribute. In the example illustrated in FIG. 5(*b*), the progress processing unit 251 may determine that three or more objects having the object ID "ObjC"

may be vertically adjacent to each other. Note that the predetermined number may not be limited to three and may be two or four or more. The automatic change condition may be satisfied when a predetermined number or more of objects of a plurality of types may be vertically or horizontally adjacent to each other. For example, the automatic change condition may be satisfied when an object with an object ID "ObjA" and an object with an object ID "ObjB" may be alternately arranged to be vertically or horizontally adjacent to each other, and the object with the object ID "ObjA," the object with the object ID "ObjB," and an object with an object ID "ObjC" may be arranged to be vertically and horizontally adjacent to each other in the described order. The automatic change condition may be satisfied when the objects of the same type or the objects a plurality of types may be arranged according to a predetermined arrangement pattern. For example, the automatic change condition may be satisfied when the objects of the same type or the objects of a plurality of predetermined types may be arranged in a cross arrangement pattern (for example, in a case in which the object with the object ID "ObjA" may be arranged at a predetermined position, the object with the object ID "ObjA" may be arranged to be adjacent to each of the top, bottom, left, and right of the predetermined position or in a case in which the object with the object ID "ObjB" may be arranged at a predetermined position, the object with the object ID "ObjC" may be arranged to be adjacent to each of the top, bottom, left, and right of the predetermined position), when the objects of the same type or the objects of a plurality of types may be arranged according to a predetermined figure shape (for example, the same objects may be arranged to form a triangular shape), or the like.

It may be determined that an object of a predetermined type does not satisfy the automatic change condition. For example, even in a case in which a certain number or more objects with an object ID "ObjE" may be arranged to be vertically or horizontally adjacent to each other, it may be determined that a certain number or more objects with the object ID "ObjE" do not satisfy the automatic change condition. Accordingly, it may be possible to reduce the possibility of the automatic object change process and change the difficulty level of the game.

FIG. 6(a) is a diagram illustrating an example of the game screen 400 in which a display forms of four objects determined to satisfy the automatic change condition may be automatically changed.

The display processing unit 252 may delete four objects determined to satisfy the automatic change condition from the game field 401. In a case in which other objects of the same type may be adjacent to a certain number of objects of the same type determined to satisfy the automatic change condition, the other objects may be a deletion target.

Then, the display processing unit 252 may display an additional game area ObjS2 corresponding to the deleted object. The additional game area ObjS2 illustrated in FIG. 6(a) may bean area including the additional game area ObjS1 illustrated in FIGS. 5(a) and 5(b). Similarly to the additional game area ObjS1 illustrated in FIGS. 5(a) and 5(b), the additional game area ObjS2 illustrated in FIG. 6(a) also may not include an area corresponding to an object that has never been deleted since the game started. In a case in which the additional game area ObjS1 and the additional game area ObjS2 may be adjacent to each other, the display processing unit 252 may integrally display the additional game area ObjS1 and the additional game area ObjS2 as one additional game area ObjS.

The display processing unit 252 may display movement of one or more objects adjacent to the deleted object in the predetermined direction. In the example illustrated in FIG. 6(a), a second object arranged above the deleted object in the screen upward direction may move in the screen downward direction. In other words, in the game field 401, the object which may be the rightmost object and the second object from the top may move to the bottom right position, and the object on the top right corner may move to the position which the rightmost position and the second position from the bottom.

Then, the display processing unit 252 may retrieve the object IDs of a plurality of objects constituting the additional object group from the game field table T2 of the game being executed stored in the storage unit 22. The display processing unit 252 may retrieve four object IDs (ObjD, ObjD, ObjB, and ObjD in the example illustrated in FIG. 14) of objects which may be rightmost objects which may not be displayed in the game field 401 among a plurality of retrieved object IDs and may be objects closest to the initial object group.

The display processing unit 252 may retrieve the image data of the object corresponding to the retrieved four object IDs with reference to the object table T1 and may arrange the retrieved four pieces of image data at the positions which may be the rightmost position and the third to sixth positions from the bottom of the game field 401 according to the arrangement of the additional object group. The display processing unit 252 may display the retrieved four pieces of image data so that they move from the upper side of the game field 401 in the screen downward direction. Accordingly, it may be possible to provide the player with the effect that the object drops from the top as if the deleted object were filled.

FIG. 6(b) is a diagram illustrating an example of the game screen 400 after the object may be moved by the automatic object change process.

FIG. 7(a) is a diagram illustrating an example of the game screen 400 in an exemplary embodiment in which the player has performed 6 game operations from the start of the game. In the example illustrated in FIG. 7(a), an additional game area ObjS3 corresponding to the object designation instruction (of 6 times) by the player and the automatic object change process may be displayed.

FIG. 7(b) is a diagram illustrating an example in which the object designation instruction may be retrieved according to the operation of the operation unit 23 by the player in the game screen 400 illustrated in FIG. 7(a).

As illustrated in FIG. 7(b), the display processing unit 252 may display the designation marker 404 centered on the tap position of the player, and may display "1" obtained by subtracting "1" time from "2" times as the number of times indicated by the number of remaining plays 402. The display processing unit 252 may not display the designation marker 404 in a case in which the player taps the position on the display screen of the display unit 24.

FIG. 8(a) is a diagram illustrating an example of the game screen 400 according to the acquisition of the object designation instruction.

The display processing unit 252 may delete the object corresponding to the object designation instruction from the game field 401. Then, the display processing unit 252 may display an additional game area ObjS4 corresponding to the deleted object. In the example illustrated in FIG. 8(a), the area ObjS4 corresponding to an object which may be the second object from the left and the second object from the bottom deleted by the (seventh) object designation instruction and the additional game area ObjS3 may be displayed.

The display processing unit 252 may display movement of one or more objects adjacent to the deleted object in a predetermined direction. In the example illustrated in FIG. 8(*a*), the objects other than the object with the object ID "ObjX" among the three objects arranged above the deleted object in the screen upward direction move in the screen downward direction. In other words, in the game field 401, the object which may be the second object from the left and the third object from the top may move to the position of the deleted object, the object which may be the second object from the left and the second object from the top may move to the position which may be the second position from the left and the third position from the top, and the object which may be the second object from the left and the first object from the top may move to the position which may be the second position from the left and the second position from the top.

As described above, the object with the object ID "ObjX" may be an object that may not move and remain at its arranged position even when the object below its arranged position in the screen downward direction may be deleted. In a case in which the object below the object with the object ID "ObjX" in the screen downward direction may be deleted, the object above the object with the object ID "ObjX" in the screen upward direction may move while slipping through the object with the object ID "ObjX." Accordingly, it may be possible to change the difficulty level of the game according to the arrangement of the object with the object ID "ObjX."

Then, the display processing unit 252 may retrieve the object IDs of a plurality of objects constituting the additional object group from the game field table T2 of the game being executed stored in the storage unit 22. The display processing unit 252 may retrieve an object ID of an object (ObjD in the example illustrated in FIG. 14) which may be the second object from the left which may not be displayed in the game field 401 among a plurality of retrieved object IDs and may be an object closest to the initial object group.

The display processing unit 252 may retrieve the image data of the object corresponding to the retrieved one object ID with reference to the object table T1, and may arrange the retrieved image data at the position which may be the second position and the first position from the top in the game field 401. The display processing unit 252 may display the retrieved image data so that it may move from the top side of the game field 401 in the screen downward direction. Accordingly, it may be possible to provide the player with the effect that the object drops from the top as if the deleted object were filled.

Next, an example of the automatic object change process that may be executed continuously will be described with reference to FIG. 8(*b*) to FIG. 10(*b*).

FIG. 8(*b*) is a diagram illustrating an example of the game screen 400 after the object is moved by the object designation instruction described with reference to FIGS. 7(*b*) and 8(*a*). The progress processing unit 251 may determine that the three objects which may be the second objects from the bottom and the second to fourth objects from the left in the game field 401 satisfy the automatic change condition with the movement of the object according to the object designation instruction.

FIG. 9(*a*) is a diagram illustrating an example of the game screen 400 in which the display forms of the three objects determined to satisfy the automatic change condition may be automatically changed.

The display processing unit 252 may delete the three objects determined to satisfy the automatic change condition from the game field 401. Then, the display processing unit 252 may display an additional game area ObjS5 including the area corresponding to the deleted object. The additional game area ObjS5 illustrated in FIG. 9(*a*) may be an area in which the additional game area ObjS3 illustrated in FIGS. 8(*a*) and 8(*b*) and the area (the additional game area ObjS3) corresponding to the three deleted objects are integrated into one area. Similarly to the additional game areas ObjS1 to ObjS4, the additional game area ObjS5 may not include the area corresponding to the object that has never been deleted since the game started.

The display processing unit 252 may display movement of one or more objects adjacent to the three deleted objects in a predetermined direction. In the example illustrated in FIG. 9(*a*), one object arranged above each of the deleted three objects in the screen upward direction passes through the object with the object ID "ObjX" and may move in the screen downward direction. In other words, in the game field 401, an object which may be the second object from the left and the third object from the top may move to a position which may be the second position from the left and the second position from the bottom, an object which may be the third object from the left and the third object from the top may move to a position which may be the third position from the left and the second position from the bottom, and an object which may be the fourth object from the left and the third object from the top may move to a position which may be the fourth position from the left and the second position from the bottom. In conjunction with these movements, in the game field 401, an object which may be the second object from the left and the second object from the top may move to a position which may be the second position from the left and the third position from the top, an object which may be the third object from the left and the second object from the top may move to a position which may be the third position from the left and the third position from the top, and an object which may be the fourth object from the left and the second object from the top may move to a position which may be the fourth position from the left and the third position from the top. Further, in the game field 401, an object which may be the second object from the left and the first object from the top may move to a position which may be the second position from the left and the second position from the top, an object which may be the third object from the left and the first object from the top may move to a position which may be the third position from the left and the second position from the top, and an object which may be the fourth object from the left and the first object from the top may move to a position which may be the fourth position from the left and the second position from the top.

Then, the display processing unit 252 may retrieve the object IDs of a plurality of objects constituting the additional object group from the game field table T2 of the game being executed stored in the storage unit 22. The display processing unit 252 may retrieve three object IDs of objects which may be second to fourth objects from the left which may not be displayed in the game field 401 among a plurality of retrieved object IDs and may be objects closest to the initial object group.

The display processing unit 252 may retrieve the image data of the object corresponding to the retrieved three object IDs with reference to the object table T1, and may arrange the retrieved three pieces of image data at the positions which may be second to fourth positions and the first position from the top in the game field 401. The display processing unit 252 may display the retrieved three pieces of image data so that it may move from the top side of the game field 401 in the screen downward direction. Accordingly, it may be possible to provide the player with the effect that the object drops from the top as if the deleted object were filled.

FIG. 9(b) is a diagram illustrating an example of the game screen 400 after the object is moved by the automatic object change process. The progress processing unit 251 may determine that an object which may be the second object from the bottom and the first object from the left, an object which may be the second object from the bottom and the second object from the left, and an object which may be the second object from the bottom and the third object from the left in the game field 401 satisfy the automatic change condition with the movement of the object according to the object designation instruction.

FIG. 10(a) is a diagram illustrating an example of the game screen 400 in which the display form of the three objects determined to satisfy the automatic change condition and the object which may be adjacent to the three objects and may be the first object from the bottom and the second object from the left may be automatically changed.

The display processing unit 252 may delete the three objects determined to satisfy the automatic change condition from the game field 401, and may delete the object which may be adjacent to the three objects and may be the second object from the left and the first object from the bottom from the game field 401. The object which may be the second object from the left and the first object from the bottom may be an object which may be adjacent to the objects determined to satisfy the automatic change condition and has the same type as the three objects. In a case in which there may be an object of the same type as the three objects among objects which may be further adjacent to the object which may be the second object from the left and the first object from the bottom, the object may be a deletion target.

Then, the display processing unit 252 may display an additional game area ObjS6 including an area corresponding to the deleted four objects. The additional game area ObjS6 illustrated in FIG. 10(a) may be an area in which the additional game area ObjS5 illustrated in FIGS. 9(a) and 9(b) and the area corresponding to the deleted four objects may be integrated into one area. Similarly to the additional game areas ObjS1 to ObjS5, the additional game area ObjS6 may not include the area corresponding to the object that has never been deleted since the game started.

The display processing unit 252 may display movement of one or more objects adjacent to the deleted four objects in a predetermined direction. In the example illustrated in FIG. 10(a), an object arranged above each of the deleted four objects in the screen upward direction passes through the object with the object ID "ObjX" and may move in the screen downward direction. In other words, in the game field 401, an object which may be the first object from the left and the third object from the top may move to a position which may be the first position from the left and the second position from the bottom, an object which may be the second object from the left and the third object from the top and an object which may be the second object from the left and the second object from the top may move to a position which may be the second position from the left and the first position from the bottom and a position which may be the second position from the left and the second position from the bottom, and an object which may be the third object from the left and the third object from the top may move to a position which may be the third position from the left and the second position from the bottom. In conjunction with these movements, in the game field 401, an object which may be the first object from the left and the second object from the top may move to a position which may be the first position from the left and the third position from the top, an object which may be the second object from the left and the first object from the top may move to a position which may be the second position from the left and the third position from the top, and an object which may be the third object from the left and the second object from the top may move to a position which may be the third position from the left and the third position from the top. Further, in the game field 401, an object on the top left corner may move to a position which may be the first position from the left and the second position from the top, and an object which may be the third object from the left and the first object from the top may move to a position which may be the third position from the left and the second position from the top.

Then, the display processing unit 252 may retrieve the object IDs of a plurality of objects constituting the additional object group from the game field table T2 of the game being executed stored in the storage unit 22. The display processing unit 252 may retrieve one object ID of an object which may be an object ID of an object which may be not displayed in the game field 401, an object ID of a leftmost object, and may be closest to the initial object group among a plurality of retrieved object IDs and two object IDs which may be object IDs of second objects from the left and may be closest to the initial object group, and may retrieve one object ID which may be an object ID of a third object from the left and may be closest to the initial object group.

The display processing unit 252 may retrieve the image data of the object corresponding to the retrieved four object IDs with reference to the object table T1. The display processing unit 252 may arrange the image data of the object corresponding to one object ID which may be the object ID of the leftmost object and may be closest to the initial object group at the position which may be the first position from the top and the first position from the left in the game field 401. The display processing unit 252 may arrange the image data of the object corresponding to one object ID which may be the object ID of the second object from the left and may be closest to the initial object group at the position which may be the second position from the top and the second position from the left in the game field 401, and may arrange the image data of the object corresponding to one object ID which may be the object ID of the second object from the left and may be second closest to the initial object group at the position which may be the first position from the top and the second position from the left in the game field 401. Further, the display processing unit 252 may arrange the image data of the object corresponding to one object ID which may be the object ID of the third object from the left and may be closest to the initial object group at the position which may be the first position from the top and the third position from the left in the game field 401. The display processing unit 252 may display the retrieved four pieces of image data so that it may move from the upper side of the game field 401 in the screen downward direction. Accordingly, it may be possible to provide the player with the effect that the object drops from the top as if the deleted object were filled.

FIG. 10(b) is a diagram illustrating an example of the game screen 400 after the object may be moved by the automatic object change process.

FIG. 11(a) is a diagram illustrating an example in which the (eighth) object designation instruction may be retrieved according to the operation of the operation unit 23 by the player in the game screen 400 illustrated in FIG. 10(b).

As illustrated in FIG. 11(a), the display processing unit 252 may display the designation marker 404 centered on the tap position of the player, and may display "0" obtained by subtracting "1" time from "1" times as the number of times indicated by the number of remaining plays 402. The display processing unit 252 may not display the designation marker 404 in a case in which the player taps the position on the display screen of the display unit 24.

FIG. 11(b) is a diagram illustrating an example of the game screen 400 according to the acquisition of the object designation instruction.

The display processing unit 252 may delete the object corresponding to the object designation instruction from the game field 401. Then, the display processing unit 252 may display an additional game area ObjS7 corresponding to the deleted object. In the example illustrated in FIG. 11(b), the additional game area ObjS7 in which the area corresponding to the object on the bottom left corner deleted by the object designation instruction and the additional game area ObjS6 illustrated in FIGS. 10(a), 10(b), and FIG. 11(a) may be integrated. Similarly to the additional game areas ObjS1 to ObjS6, the additional game area ObjS7 may not include the area corresponding to the object that has never been deleted since the game started.

The display processing unit 252 may display movement of one or more objects adjacent to the deleted object in a predetermined direction. In the example illustrated in FIG. 11(b), the objects other than the object with the object ID "ObjX" among the objects arranged above the deleted object in the screen upward direction may move in the screen downward direction. In other words, in the game field 401, the object which may be the first object from the left and the second object from the bottom may move to the position of the deleted object, the object which may be the first object from the left and the third object from the top may move to the position which may be the first position from the left and the second position from the bottom, the object which may be the first object from the left and the second object from the top may move to the position which may be the first position from the left and the third position from the top, and the object on the top left corner may move to the position which may be the first position from the left and the second position from the top.

Then, the display processing unit 252 may retrieve the object IDs of a plurality of objects constituting the additional object group from the game field table T2 of the game being executed stored in the storage unit 22. The display processing unit 252 may retrieve an object ID of an object which may be the leftmost object which may not be displayed in the game field 401 among a plurality of retrieved object IDs and may be an object closest to the initial object group.

The display processing unit 252 may retrieve the image data of the object corresponding to the retrieved one object ID with reference to the object table T1, and may arrange the retrieved image data at the position on the top left corner in the game field 401. The display processing unit 252 may display the retrieved image data so that it may move from the top side of the game field 401 in the screen downward direction. Accordingly, it may be possible to provide the player with the effect that the object drops from the top as if the deleted object were filled.

FIG. 12(a) is a diagram illustrating an example of the game screen 400 after the object is moved by the object designation instruction. The progress processing unit 251 may determine that the game complete condition is satisfied in a case in which the additional game area ObjS7 may include the start position indicated by the start indication 403a and the goal position indicated by the goal indication 403b. The game complete condition may be satisfied when the number of times indicated by the number of plays 402 may be "0" (the player inputs eight object designation instructions). The game complete condition may be satisfied when the additional game area ObjS7 including the start position indicated by the start indication 403a and the goal position indicated by the goal indication 403b, and the number of times indicated by the number of plays 402 may be "0."

The start position may be an arrangement position of the object adjacent to the start indication 403a, that is, a position of the object on the top left corner in the game field 401. The goal position may be an arrangement position of the object adjacent to the goal indication 403b, that is, a position of the object on the bottom left corner in the game field 401.

In the example illustrated in FIG. 12(a), since the additional game area ObjS7 may include the start position indicated by the start indication 403a and the goal position indicated by the goal indication 403b, the progress processing unit 251 may determine that the game complete condition is satisfied.

In a case in which the additional game area ObjS does not include the start position indicated by the start indication 403a and the goal position indicated by the goal indication 403b even though the number of remaining plays 402 may be "0," the progress processing unit 251 may determine that the game complete condition may not be satisfied, and the game end condition is satisfied. In a case in which it may be determined that the game complete condition is not satisfied and the game end condition may be satisfied, the progress processing unit 251 may store the game progress data indicating that the corresponding game stage has not been completed in the storage unit 22, and may end the game of the corresponding game stage.

FIG. 12(b) may be a diagram illustrating an example of the game screen 400 in which the additional game may be executed. The display processing unit 252 may display the game screen 400 in which the additional game may be executed in a case in which the progress processing unit 251 may determine that the game complete condition is satisfied.

The additional game may be automatically started if the game screen 400 in which the additional game may be executed is displayed. In the example illustrated in FIG. 12(b), the game content included in the start indication 403a may move to the start position and automatically may move to the goal position in the additional game area ObjS7 (or the goal indication 403b via the goal position). The display processing unit 252 may perform control such that the game content automatically may move on a path created using a known a shortest path search technique using graph data in which a center position of each object in the additional game area ObjS7 may be set as a node and a space between adjacent nodes may be set as a link to be connected. In a case in which the game content may move to the goal position (or the goal indication 403b via the goal position), the progress processing unit 251 may store the game progress data including information indicating that the game stage has been completed in the storage unit 22, and may end the game of the corresponding game stage. The movement of the game content may be performed manually according to the operation of the player. Also, the progress processing unit 251 may store a privilege corresponding to a moving distance of the game content in the storage unit 22 and the server storage unit 32 in association with the player. For example, in a case in which the moving distance of the game content may be a first distance or more, a predetermined privilege may be stored in the storage unit 22 and the server storage unit 32 in association with the player. Accordingly, the player can consider a strategy of an operation of tapping the object so that the additional game area ObjS has the longer moving distance, and it may be possible to provide the player with a more sophisticated game. In a case in which the moving distance of the game content may be a second distance or less, a predetermined privilege may be stored in the storage unit 22 and the server storage unit 32 in association with the player. Accordingly, the player can consider a strategy of an operation of tapping the object so that the additional game area ObjS has the smaller moving distance, and it may be possible to provide the player with a more sophisticated game.

In a case in which the game complete condition may not be a condition satisfied when the additional game area ObjS7 includes the start position indicated by the start indication 403*a* and the goal position indicated by the goal indication 403*b*, the display processing unit 252 may perform a display indicating that the additional game has failed if the additional game area ObjS7 does not include at least one of the start position and the goal position. In this case, the progress processing unit 251 may store the game progress data including information indicating that the corresponding game stage may not be completed in the storage unit 22 and may end the game of the corresponding game stage.

If the game of the game stage may end, the progress processing unit 251 may transmit the game progress data stored in the storage unit 22 to the server 3 via the communication unit 21. The server receiving unit 331 of the server 3 may receive the game progress data transmitted from the mobile terminal 2 via the server communication unit 31. The storage processing unit 334 of the server 3 may execute a server registration process of storing the game progress data received by the server receiving unit 331 in the server storage unit 32.

Figure 15:
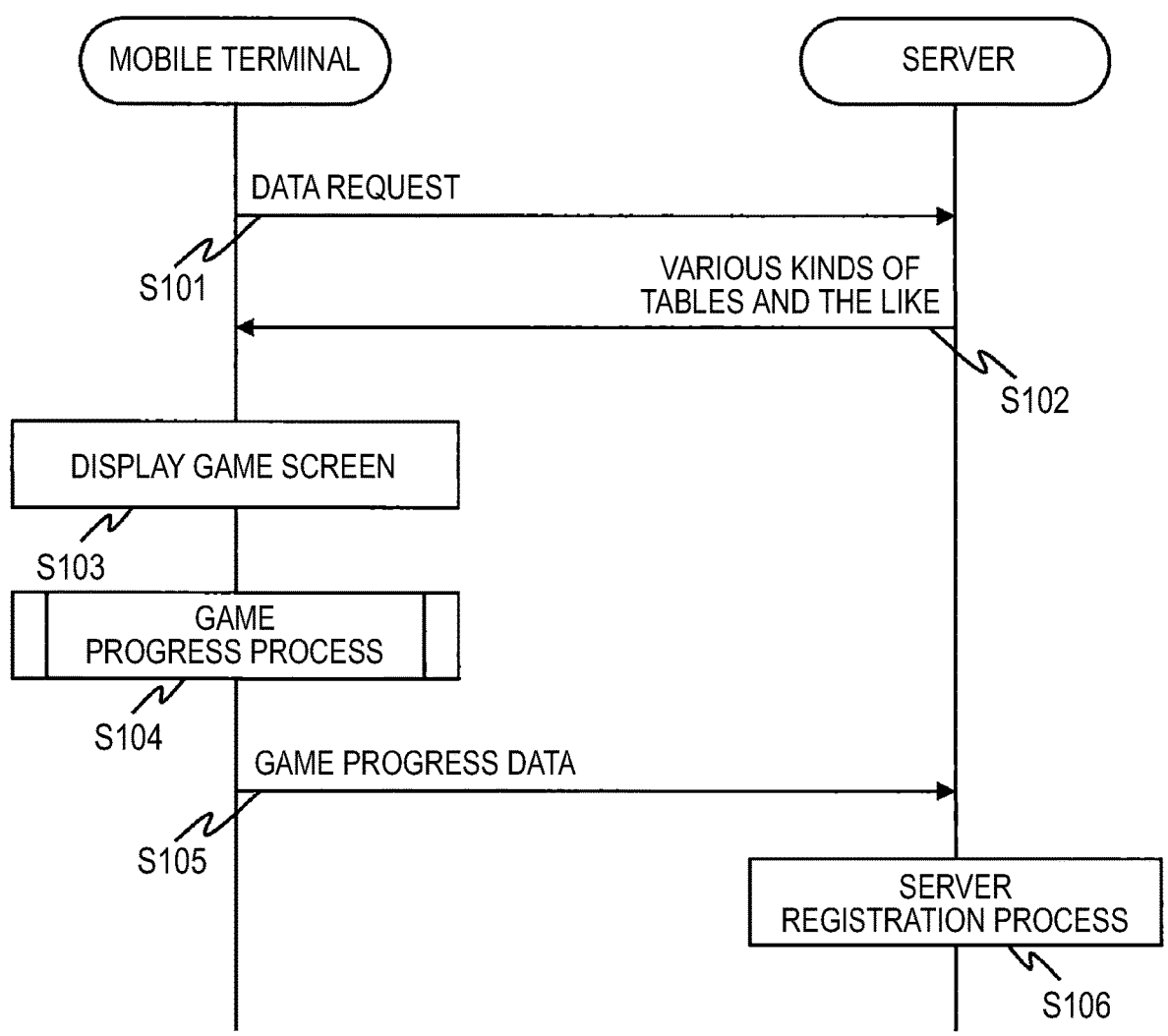
FIG. 15 is a diagram illustrating an example of an operation sequence of the game system 1.

FIG. 15 is a diagram illustrating an example of the operation sequence of the game system 1. This operation sequence may be executed in cooperation with the respective elements of the mobile terminal 2 and the server 3 mainly through the terminal processing unit 25 and the server processing unit 33 on the basis of the program previously stored in the storage unit 22 and the server storage unit 32.

If the progress processing unit 251 of the mobile terminal 2 activates the game application program according to the start indication input according to the operation of the operation unit 23 by the player, a data request including the player ID stored in the storage unit 22 may be transmitted to the server 3 via the communication unit 21 (step S101).

The server receiving unit 331 of the server 3 may receive the data request transmitted from the mobile terminal 2 through the server communication unit 31. Then, the data acquiring unit 332 of the server 3 may retrieve the game progress data of the player stored in the server storage unit 32 on the basis of the player ID included in the data request. The data acquiring unit 332 may identify one of the game stages that the player has not yet played on the basis of the retrieved game progress data, and may retrieve the game field table T2 of the one game stage from the server storage unit 32. Then, the server transmitting unit 333 of the server 3 may transmit the game field table T2 retrieved by the data acquiring unit 332 and the object table T1 and the image data of the object stored in the server storage unit 32 to the mobile terminal 2 through the server communication unit 31 (step S102).

The progress processing unit 251 of the mobile terminal 2 may receive the object table T1, the game field table T2, and the image data of the object transmitted from the server 3 through the communication unit 21. The display processing unit 252 of the mobile terminal 2 may display the game screen 400 on the display unit 24 on the basis of the object table T1, the game field table T2, and the image data of the object received by the progress processing unit 251 (step S103).

Then, the progress processing unit 251 and the display processing unit 252 may execute the game progress process (step S104). The game progress process will be described later in detail.

If the game progress process ends, the progress processing unit 251 may transmit the game progress data related to the game result based on the game progress process (the identification data identifying the game stage that the player has already played and completed or the like) to the server 3 through the communication unit 21 (step S105).

If the game progress data transmitted from the mobile terminal 2 may be received by the server receiving unit 331 of the server 3, the storage processing unit 334 of the server 3 may execute the server registration process of storing the received game progress data in the server storage unit 32 (step S106).

Figure 16:
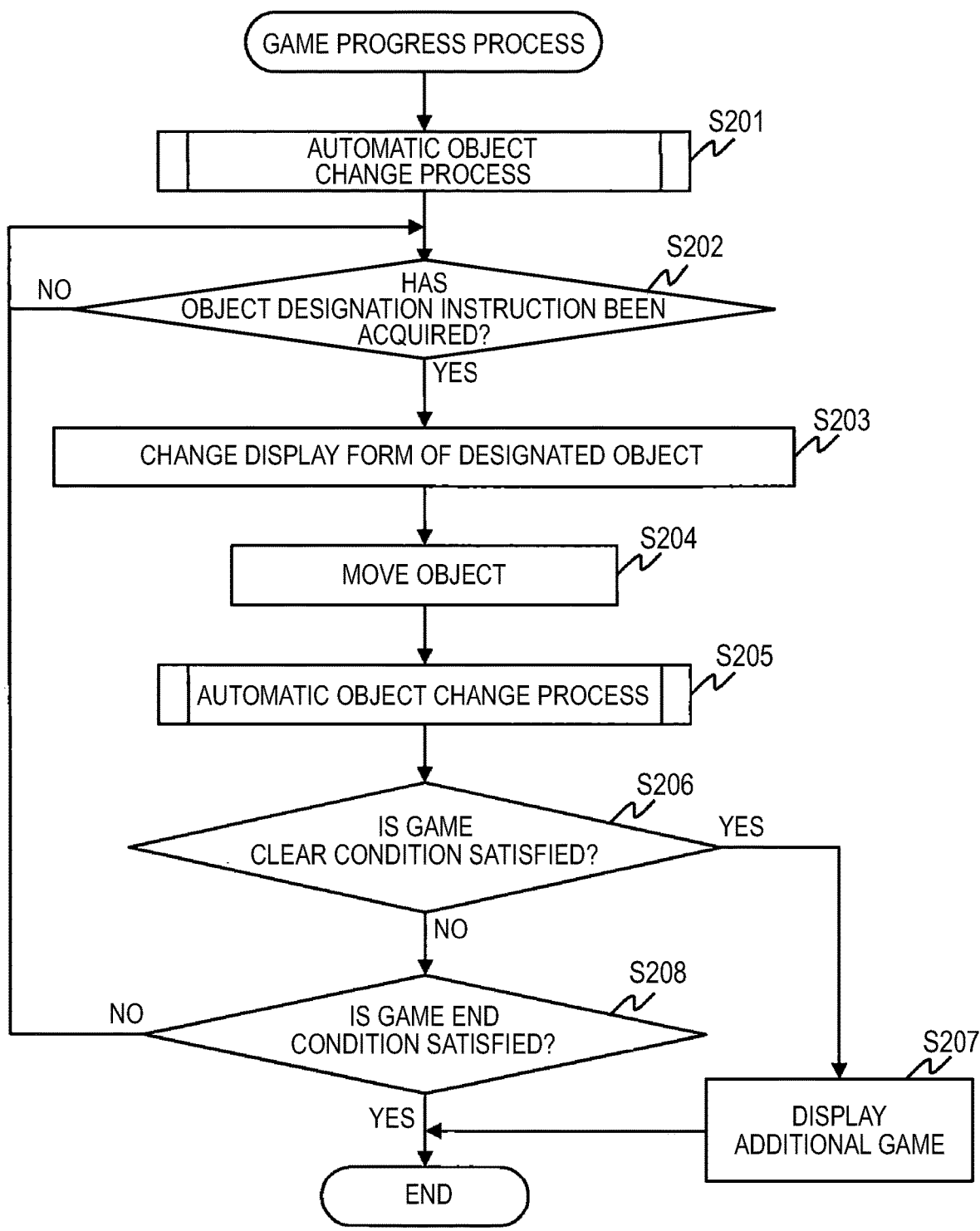
FIG. 16 is a diagram illustrating an example of an operation flow of a game progress process.

FIG. 16 is a diagram illustrating an example of an operation flow of the game progress process by the progress processing unit 251 and the display processing unit 252 of the mobile terminal 2. The game progress process illustrated in FIG. 16 may be executed in step S104 of FIG. 15.

The progress processing unit 251 and the display processing unit 252 may execute the automatic object change process (step S201). The automatic object change process will be described later in detail.

The progress processing unit 251 may determine whether or not the object designation instruction corresponding to the operation of the operation unit 23 by the player is retrieved (step S202). The progress processing unit 251 may be on standby until the player may receive the object designation instruction corresponding to the operation of the operation unit 23 (No in step S202).

In a case in which the object designation instruction corresponding to the operation of the operation unit 23 by the player may be retrieved (Yes in step S202), the display processing unit 252 may change the display form of the designated object (step S203).

Then, the display processing unit 252 may display the movement of one or more objects adjacent to the object whose display form has been changed in a predetermined direction (step S204).

Then, the progress processing unit 251 and the display processing unit 252 may execute the automatic object change process (step S205). The automatic object change process will be described later in detail.

Then, the progress processing unit 251 may determine whether or not the game complete condition may be satisfied (step S206).

In a case in which it is determined that the game complete condition is satisfied (Yes in step S206), the game screen 400 for executing the additional game may be displayed (step S207), and the game progress process may end.

In a case in which it is determined that the game complete condition is not satisfied (No in step S206), the display processing unit 252 may determine whether or not the game end condition is satisfied (step S208).

In a case in which it is determined that the game end condition is not satisfied (No in step S208), the progress processing unit 251 may cause the process to return to step S202.

In a case in which it is determined that the game end condition is satisfied (Yes in step S208), the game progress process may end.

Figure 17:
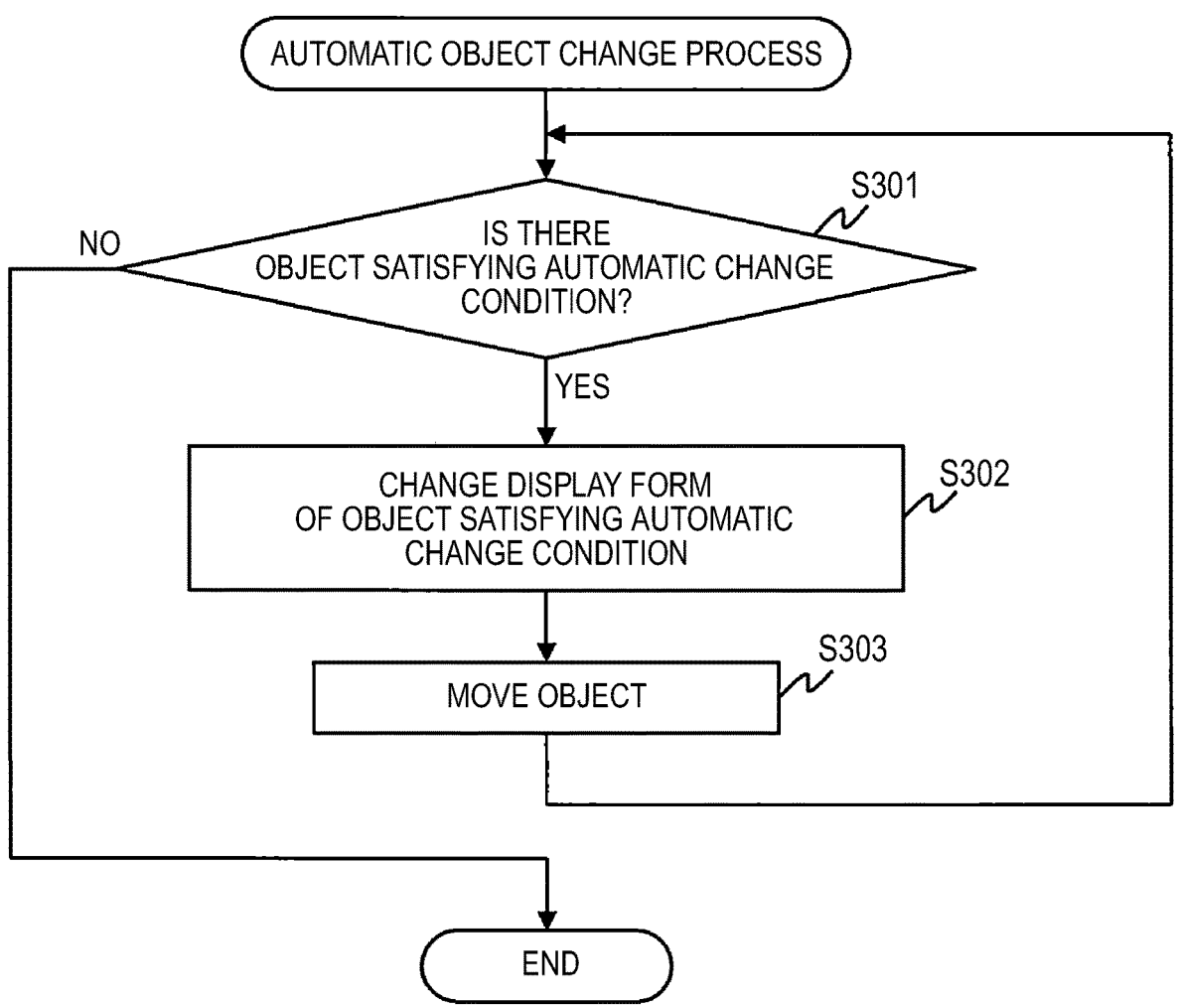
FIG. 17 is a diagram illustrating an example of an operation flow of an automatic object change process.

FIG. 17 is a diagram illustrating an example of an operation flow of an automatic object change process by the progress processing unit 251 and the display processing unit 252 of the mobile terminal 2. The automatic object change process illustrated in FIG. 17 may be executed in steps S201 and S205 of FIG. 16.

First, the progress processing unit 251 may determine whether or not there is an object satisfying the automatic change condition in the game field 401 (step S301).

Ina case in which it is determined that there is an object satisfying the automatic change condition in the game field 401 (Yes in step S301), the display processing unit 252 may change the display form of the object satisfying the automatic change condition (step S302). The display processing unit 252 may change the display form of an object that may be adjacent to the object satisfying the automatic change condition and that has the same type as the object satisfying the automatic change condition.

Then, the display processing unit 252 may display the movement of one or more objects adjacent to the object whose display form has been changed in a predetermined direction (step S303), and may cause the process to return to step S301.

Ina case in which it is determined that there is no object satisfying the automatic change condition in the game field 401 (No in step S301), the automatic object change process may end.

As described above in detail, the game system 1 of the present embodiment can provide the additional game corresponding to the operation result of the puzzle game to the player who has played the puzzle game. In other words, the game system 1 of the present embodiment can provide the player with the user interface of realizing various game developments without increasing the type and/or number of game objects or increasing the moving speed of the game object. Further, in a case in which the mobile terminal 2 is a handheld computer such as a smartphone or a tablet terminal, an operation on the object displayed on the display screen of the display unit 24 of the mobile terminal 2 may be performed by a finger, a stylus, or the like of the player who operates the operation unit 23 (the touch panel). In this case, as the number of objects displayed on the display screen increases, the frequency of the occurrence of the operation errors may increase. However, the game system 1 of the present embodiment can execute the additional game reusing information of a previous game area after the previous game may be executed and realize various game developments while maintaining the operability without increasing the type and/or number of game objects and the moving speed.

The invention may not be limited to the present embodiment. For example, in the game field 401, in a case in which there are a second predetermined number of objects of the same type (with the second predetermined number being greater than a predetermined number in the automatic object changing process) which are arranged to be vertically or horizontally adjacent to each other, the second predetermined number of objects of the same type may be deleted, and a special object may be displayed at an arrangement position of any one of the second predetermined number of objects of the same type. In this case, the objects arranged above the display position of the special object in the screen upward direction may not move in the screen downward direction by one object.

In a case in which the player taps the special object, a predetermined game effect may be executed on other objects than the special object arranged in the game field 401. For example, in a case in which the player taps the special object, all objects (except the object ID "ObjX") within a predetermined range centered on the special object among a plurality of objects arranged in the game field 401 may be deleted, and display may be performed such that the object arranged above the deleted object in the screen upward direction may move to the position of the deleted object. Further, in conjunction with this movement, the image data of the object with the object ID of the additional object group may be displayed at the arrangement position before the moved object moves. Also, in a case in which the player taps the special object, the object attribute of objects of a predetermined type or objects of all types among other objects arranged in the game field 401 may be changed. In a case in which a predetermined effect is executed on other objects than the special object, the number indicated by the number of remaining plays 402 may be decremented by one.

As described above, in the game system 1 of the present embodiment, it may be possible to provide the player with games with diversity by causing a special object to appear in a case in which more objects may be simultaneously deleted than in the automatic change process.

Further, as described with reference to FIGS. 8(b) to 10(b), in a case in which the automatic object change process may be consecutively executed, the progress processing unit 251 may store a consecutive point value in the storage unit 22. For example, if the automatic object change process may be executed twice consecutively after the game starts, the progress processing unit 251 may store "2" in the storage unit 22 as the consecutive point value.

Then, in a case if the automatic object change process may be executed four times consecutively according to the object designation instruction by the player, the progress processing unit 251 may store "6" (obtained by adding "4" to stored "2") in the storage unit 22 as the consecutive point value. Further, if the automatic object change process is executed three times consecutively according to the object designation instruction by the player, the progress processing unit 251 may store "9" (obtained by adding "6" to stored "3") in the storage unit 22 as the consecutive point value. The display processing unit 252 may display the consecutive point value in the game screen 400.

In a case in which the consecutive point value is a predetermined point number (for example, "10") or more, the progress processing unit 251 may subtract the predetermined point number (for example, "10") from the consecutive point value, and the display processing unit 252 may display a predetermined image (an icon or the like) in the game screen 400.

In a case in which the player taps a predetermined image, a predetermined game effect may be executed on one or more objects arranged in the game field 401. For example, in a case in which the player taps a predetermined image, the display processing unit 252 may change a predetermined type of object arranged in the game field 401 to another type of object. For example, the display processing unit 252 may change each object with the object ID "ObjE" to any one of other object IDs "ObjA" to "ObjD." In a case in which the three objects with the object ID "ObjE" may be arranged in the game field 401, all of the three objects may be changed to the object with object ID "ObjA." Alternatively, the three objects may be changed to the object with the object ID "ObjA," the object with the object ID "ObjB," and the object with the object ID "ObjC," respectively. Further, in a case in which the player taps a predetermined image, the display processing unit 252 may delete all or some of a predetermined type of objects arranged in the game field 401. Further, the display processing unit 252 may change all or some of objects associated with a predetermined attribute arranged in the game field 401 to have other attributes.

As described above, the game system 1 of the present embodiment can automatically change some of a plurality of objects in the game field 401 by causing the player to continuously perform the automatic change process, and thus it may be possible to provide the payer with games with diversity.

Moreover, the change in the display form of the object may be a change in a display color associated with a composition of an object. For example, in a case in which an object with an object ID "ObjA" is tapped and an object with an object ID "ObjB" that may be adjacent to the object with the object ID "ObjA" in the screen upward direction may move in the screen downward direction, the progress processing unit 251 may read a new object with an object ID "ObjF" in which the object with the object ID "ObjA" and the object with the object ID "ObjB" may be combined from the object table T1, and the display processing unit 252 may display the object with the object ID "ObjF" at the display position of the object with the object ID "ObjA."

Accordingly, in a case in which the object adjacent to the object corresponding to the object designation instruction in the screen upward direction may be a specific combination, a new object appears, and thus it may be possible to provide the player with games with diversity.

Also, depending on the area size of the additional game area ObjS when the additional game starts, the privilege may be associated with the player and stored in the storage unit 22 and the server storage unit 32. For example, in a case in which the area size of the additional game area ObjS when the additional game is started is smaller than a predetermined first area size, the privilege may be associated with the player and stored in the storage unit 22 and the server storage unit 32. Accordingly, it may be possible to give the privilege to the player who completes the game efficiently with a smaller number of deleted objects in the game field 401. In a case in which the area size of the additional game area ObjS when the additional game is started may be larger than a predetermined second area size, the privilege may be associated with the player and stored in the storage unit 22 and the server storage unit 32. Accordingly, it may be possible to give the privilege to the player who deletes more objects in the game field 401 and completes the game.

Also, the game screens 400 illustrated in FIG. 4(a) to FIG. 12(b) may be simultaneously provided to the mobile terminals 2 owned by a plurality of players. For example, the game system 1 may provide a competition game using a single game screen 400 to a plurality of players.

In this competition game, the area corresponding to the object deleted by each player may be associated with each of the players who may be provided with the competition game by the game system 1. For example, the server receiving unit 331 may receive information related to the area corresponding to the object deleted by each player transmitted from each the mobile terminal 2 through the server communication unit 31, and the server storage unit 32 may store the information related to the area corresponding to the object deleted by the player in association with the player ID of each player. In a case in which transmission and reception of data are executed between the mobile terminals 2 either directly or via the server 3, the information related to the area corresponding to the object deleted by each player transmitted from each mobile terminal 2 may be received by one or more mobile terminals 2 other than the mobile terminal 2 which has transmitted the information, and in each mobile terminal 2, the area corresponding to the object deleted by each player may be stored in each storage unit 22 in association with each player.

For example, the game field 401 in which a plurality of objects are arranged may be displayed on the display units 24 of the mobile terminals 2 of a plurality of players, and the additional game area ObjS corresponding to each player may be displayed on the display unit 24 of the mobile terminal 2 of each player. In other words, in a case in which a competition game may be provided to a player A and a player B, an additional game area ObjS-a of the player A and an additional game area ObjS-b of the player B may be displayed in the single game field 401.

In this competition game, control may be performed such that the player is unable to use the additional game area ObjS of other players as their own additional game area ObjS. For example, in a case in which the display form of the object has been changed and the object has been moved according to the object designation instruction of the player A, and the automatic object change process is completed (or not executed), the player B can give the object designation instruction. In a first exemplary embodiment, even in a case in which an object in the additional game area ObjS-a of the player A is deleted according to the object designation instruction of the player B, the area corresponding to that object may not be integrated with the additional game area ObjS-b of the player B. In a second exemplary embodiment, in a case in which the object in the additional game area ObjS-a of the player A is deleted according to the object designation instruction of the player B, the area corresponding to that object be removed from the additional game area ObjS-a of the player A and may be integrated with the additional game area ObjS-b of the player B. Further, in a third exemplary embodiment, in a case in which the object in the additional game area ObjS-a of the player A is deleted according to the object designation instruction of the player B, the area corresponding to that object may remain the additional game area ObjS-a of the player A and may also be integrated with the additional game area ObjS-b of the player B (that is, the area corresponding to the deleted object may be included in both the additional game area ObjS-a and the additional game area ObjS-b).

As described above, the game system 1 can provide a plurality of players with a game in which a puzzle game and a strategy game can be played at the same time. Further, the game system 1 can prevent the decrease in the visibility of objects by the player, prevent the reduction in the input accuracy of the player associated with the reduction in the player's visibility of the object, the increase in the type and/or number of a plurality of objects in the limited display area of the display unit 24 of the mobile terminal 2, and/or the increase in the moving speed, and thus provide the player with the user interface of realizing various game developments without degrading usability.

In this competition game, in a case in which the object arranged at the same position is deleted a certain number of times depending on the object designation instruction by the player (and according to the automatic object change process executed by the object designation instruction), the area corresponding to that position may be set as the additional game area ObjS of the player.

The additional game may be any game as long as the game uses the additional game area ObjS. For example, the additional game may be a board game in which pieces can be arranged only in the additional game area ObjS. The additional game may be a quiz game in which an image having the same size as the game field 401 may be displayed by masking areas other than the additional game area ObjS, and a query about a name of an image may be given.

Also, the puzzle game and the additional game may be executed at the same time. For example, the additional game may be an escape game that protects a game content from a combat game content that may automatically move in the game field 401.

In this case, at the same time as the start of the game, the game content and the combat game content may move only in the additional game area ObjS in the game field. The game content may automatically move in the additional game area ObjS, and the combat game content traces the game content which may automatically move. The player may give the object designation instruction so that the additional game area ObjS may be generated, so that the movable area of the game content may increase, and the game content can escape from the trace of the combat game content. For example, the progress processing unit 251 may determine that the player has succeeded in the escape game if the game content is not captured by the combat game content for a predetermined time (if the combat game content does not reach the position of the game content) and store a predetermined privilege in the storage unit 22 and the server storage unit 32 in association with the player.

In this escape game, the game content and the combat game content may be movable in the areas other than the additional game area ObjS in the game field. In this case, the game content may automatically move in the areas other than the additional game area ObjS in the game field 401, and the combat game content tracks the game content that may automatically move. The player may give an object designation instruction so that the additional game area ObjS may be generated, so that the movable area of the combat game content decreases, and the combat game content may be unable to trace the game content. For example, the progress processing unit 251 may determine that the player has succeeded in the escape game if the game content may not be captured by the combat game content for a predetermined time and may store a predetermined privilege in the storage unit 22 and the server storage unit 32 in association with the player.

Also, the game executed before the additional game may be not limited to the puzzle game but may be a game in which the player taps the game screen 400 (for example, a shading game, a board game such as a chase, or the like).

Also, the progress of the game in the present embodiment may be changed according to the relation of the object corresponding to the object designation instruction (the object deleted by the operation of the player) and/or the object satisfying the automatic change condition (the object deleted in a case in which the automatic change condition may be satisfied) and the additional game area ObjS.

For example, in the started game, in a case in which the area attribute for the additional game area ObjS may be stored in the storage unit 22 in advance, if the object attribute of the object deleted by the operation of the player and/or the object attribute of the object deleted in a case in which the automatic change condition may be satisfied has a predetermined relation with the area attribute, the area corresponding to the deleted object may be set as the additional game area ObjS of the player. The predetermined relation between the object attribute and the area attribute may be, for example, a relation that the object attribute and the area attribute may be identical to each other, a relation that a combination of the object attribute and the area attribute may be identical to a predetermined combination, or the like.

Further, for example, in a case in which the object adjacent to the object corresponding to the object designation instruction in the screen upward direction may be a specific combination, the additional game area ObjS corresponding to the specific combination may be displayed at the position corresponding to the object corresponding to the object designation instruction. In a case in which the game ends, the privilege corresponding to the area size of the additional game area ObjS corresponding to the specific combination may be stored in the storage unit 22 in association with the player.

Further, the same area attribute as the object attribute of the deleted object may be associated with the area corresponding to the object deleted by the operation of the player and/or the area corresponding to the object deleted in a case in which the automatic change condition may be satisfied. In a case in which the area attribute of the area which may be adjacent to the additional game area ObjS and corresponds to the deleted object may be identical to the area attribute of the additional game area ObjS, the area corresponding to the deleted object may be integrated into the additional game area ObjS.

In a case in which a plurality of types of object attributes may be set in the game and there may be at least two or more types of object attributes of the deleted object, the additional game area ObjS used when the game is satisfied and the additional game is executed may be associated with at least two types of area attributes. In this case, the additional game corresponding to at least two types of area attributes may be executed. For example, settings may be performed such that the game content can move automatically in the additional game area ObjS corresponding to a first area attribute out of at least two types of area attributes, and the game content can be moved (manually), by the operation of the player, in the additional game area ObjS corresponding to a second area attribute out of at least two types of area attributes.

Also, for example, in a case in which the player attribute is stored in the storage unit 22 in association with the player, and any one of at least two types of area attributes associated with the additional game area ObjS is identical to the player attribute, the additional game area ObjS having the same area attribute as the player attribute may be stored in the storage unit 22 in association with the player. In this case, depending the area size of the additional game area ObjS associated with the player, the privilege and/or the point may be stored in the storage unit 22 in association with the player.

Further, for example, in a case in which the game element such as a terrain, an item, a castle, a town, a building, or a character each having a plurality of types of attributes may be arranged in advance in the game field of the additional game, the game element having the same attribute as the area attribute of the game area ObjS may be stored in the storage unit 22 in association with the player. In this case, the progress processing unit 251 may perform control such that only the game element associated with the player can be used in the additional game. Further, the progress processing unit 251 may cause the game element associated with the player to be usable during the execution period of the additional game and cause the game element not associated with the player to be usable in a case in which a predetermined use condition is satisfied. The predetermined use condition may be, for example, satisfied when a current time is within a predetermined period of the execution period of the additional game (shorter than the execution period of the additional game), when a predetermined item is used by the player, when the area size of each of two or more types of additional game areas ObjS is a predetermined area or more, or the like.

Also, the game system 1 may be configured to include only a plurality of mobile terminals 2, respectively, operated by a plurality of players. Each of a plurality of mobile terminals may perform wireless communication with other mobile terminals 2 according to a predetermined communication scheme, and a plurality of mobile terminals 2 may constitute an ad hoc network. In this case, a specific mobile terminal 2 among a plurality of mobile terminals 2 functions as a host and may execute the respective functions of the server 3 described above. The game described above may be executed such that the mobile terminal 2 other than the specific mobile terminal 2 among a plurality of mobile terminals 2 may perform communication with the specific mobile terminal 2 that may execute the respective functions of the server 3. The specific mobile terminal 2 that functions as a host may execute both the functions of the server 3 and the functions of the mobile terminal 2. Also, the predetermined communication scheme may be, for example, a wireless communication scheme of the IEEE 802.11 standard, and the like.

Also, some of the functions of the terminal processing unit 25 of the mobile terminal 2 may be realized by the server processing unit 33 of the server 3. The server processing unit 33 may execute the game progress process, and the display processing unit 252 of the mobile terminal 2 may cause the result of the game progress process transmitted from the server 3 to be displayed on the display unit 24. The game system 1 that provides such a so-called web game makes it possible to reduce the processing load on the mobile terminal 2.

It will be appreciated by those skilled in the art that various modifications, substitutions, and revisions can be made thereto without departing from the spirit and scope of the invention.

REFERENCE SIGNS LIST

1 game system
2 mobile terminal
21 communication unit
22 storage unit
23 operation unit
24 display unit
25 terminal processing unit
251 progress processing unit
252 display processing unit
3 server
31 server communication unit
32 server storage unit
33 server processing unit
331 server receiving unit
332 data acquiring unit
333 server transmitting unit
334 storage processing unit
4 base station
5 mobile communication network
6 gateway
7 Internet

The invention claimed is:

1. A game apparatus, comprising:
a display unit including a display screen; and
a processing unit configured to:
cause a plurality of objects to be displayed on the display screen of the display unit,
initiate a game progress process, and based on the game progress process, change, in a case in which at least one object of the plurality of objects is operated by a player in a first game, a display form of one or more objects including at least the operated object and specify an area corresponding to the one or more objects, evaluate a game complete condition, terminate the first game based on the game complete condition, and stop the game progress process, and
after terminating the first game, initiate a second game different from the first game, display, in a case in which a first condition related to the first game is satisfied, a new game screen for the second game having the specified area as a second game area used in the second game, receive at least one control input associated with a second game object, and control at least one operation of the second game object based on the at least one control input.

2. The game apparatus according to claim 1, wherein the first condition is satisfied when a number of designations of the object by the player reaches a predetermined number.

3. The game apparatus according to claim 1, wherein, in a case in which the second game area is adjacent to another second game area, the processing unit is configured to integrate the adjacent two second game areas into one second game area, and
wherein the processing unit is configured to determine that the first condition is satisfied upon determination that at least one second game area includes a predetermined position used in the second game.

4. The game apparatus according to claim 1, wherein the changing of the display form of the operated object includes deleting the operated object from the display screen.

5. The game apparatus according to claim 4, wherein the processing unit is configured to perform display control such that an object adjacent to the deleted object in a predetermined direction among the plurality of objects is automatically moved to a position of the deleted object in the display screen.

6. The game apparatus according to claim 5, wherein the processing unit is configured to delete an object satisfying a second condition as the adjacent object is moved from the display screen, and is configured to display an area corresponding to the deleted object as the second game area.

7. The game apparatus according to claim 6, wherein the object satisfying the second condition is deleted from the display screen as the deleted object is automatically moved, and
a predetermined parameter value is increased according to the number of times that the second condition is satisfied consecutively.

8. The game apparatus according to claim 7, wherein an attribute is associated with each of the plurality of objects, and
in a case in which a third condition relating to the predetermined parameter value is satisfied, the predetermined attribute is changed to another attribute for an object associated with a predetermined attribute displayed on the display screen.

9. The game apparatus according to claim 1, wherein the processing unit is configured to specify the area corresponding to the one or more objects by:

after changing the one or more objects including at least the operated object, triggering, based on changing the one or more objects, specification of the area corresponding to the one or more objects, said area corresponding to the one or more objects including at least the operated object.

10. A control method of a game apparatus including a display unit including a display screen, comprising:

with a processing unit of the game apparatus, controlling the display unit to cause a plurality of objects to be displayed on the display screen of the display unit;

with the processing unit, initiating a game progress process, and based on the game progress process, changing, in a case in which at least one object of the plurality of objects is operated by a player in a first game, a display form of one or more objects including at least the operated object and specifying an area corresponding to the one or more objects, evaluating a game complete condition, terminating the first game based on the game complete condition, and stopping the game progress process; and after terminating the first game, initiating, with the processing unit, a second game different from the first game, displaying, on the display unit, in a case in which a first condition related to the first game is satisfied, a new game screen for the second game having the specified area as a second game area used in the second game different from the first game, receiving, from the game apparatus, at least one control input associated with a second game object, and controlling, with the processing unit, at least one operation of the second game object based on the at least one control input.

11. The control method according to claim 10, wherein specifying the area corresponding to the one or more objects comprises:

after changing the one or more objects including at least the operated object, triggering, based on changing the one or more objects, specification of the area corresponding to the one or more objects, said area corresponding to the one or more objects including at least the operated object.

12. A non-transitory computer-readable medium embodying a control program of a game apparatus including a display unit including a display screen, the control program, when executed, causing the game apparatus to execute:

with a processing unit of the game apparatus, controlling the display unit to cause a plurality of objects to be displayed on the display screen of the display unit;

with the processing unit, initiating a game progress process, and based on the game progress process, changing, in a case in which at least one object of the plurality of objects is operated by a player in a first game, a display form of one or more objects including at least the operated object and specifying an area corresponding to the one or more objects, evaluating a game complete condition, terminating the first game based on the game complete condition, and stopping the game progress process; and after terminating the first game, initiating, with the processing unit, a second game different from the first game, displaying, on the display unit, in a case in which a first condition related to the first game is satisfied, a new game screen for the second game having the specified area as a second game area used in the second game different from the first game, receiving, from the game apparatus, at least one control input associated with a second game object, and controlling, with the processing unit, at least one operation of the second game object based on the at least one control input.

13. The non-transitory computer-readable medium according to claim 12, wherein specifying the area corresponding to the one or more objects comprises:

after changing the one or more objects including at least the operated object, triggering, based on changing the one or more objects, specification of the area corresponding to the one or more objects, said area corresponding to the one or more objects including at least the operated object.

* * * * *